United States Patent [19]

Kawamori

[11] Patent Number: 5,220,499
[45] Date of Patent: Jun. 15, 1993

[54] ELECTRONIC MEASURING APPARATUS HAVING GENERAL PURPOSE PROCESSING UNIT

[75] Inventor: Yuji Kawamori, Zama, Japan
[73] Assignee: Anritsu Corporation, Tokyo, Japan
[21] Appl. No.: 613,728
[22] PCT Filed: Mar. 30, 1990
[86] PCT No.: PCT/JP90/00440
    § 371 Date: Nov. 21, 1990
    § 102(e) Date: Nov. 21, 1990
[87] PCT Pub. No.: WO90/12291
    PCT Pub. Date: Oct. 18, 1990

[30] Foreign Application Priority Data

Mar. 31, 1989 [JP] Japan .................................. 1-82722

[51] Int. Cl.$^5$ .............................................. G06F 15/00
[52] U.S. Cl. ..................... 364/188; 364/579
[58] Field of Search .................. 364/579, 580, 571.08, 364/481, 484, 133, 188, 191

[56] References Cited

U.S. PATENT DOCUMENTS

| | | | |
|---|---|---|---|
| 4,399,502 | 8/1983 | MacDonald et al. | 364/579 |
| 4,561,049 | 12/1985 | Deleganes et al. | 364/130 |
| 4,949,290 | 8/1990 | Pike et al. | 364/580 |

FOREIGN PATENT DOCUMENTS

| | | |
|---|---|---|
| 52-67368 | 6/1977 | Japan . |
| 59-146398 | 8/1984 | Japan . |
| 59-174994 | 10/1984 | Japan . |
| 59-188522 | 10/1984 | Japan . |
| 62-274219 | 11/1987 | Japan . |
| 63-298616 | 12/1988 | Japan . |
| 64-84322 | 3/1989 | Japan . |

OTHER PUBLICATIONS

Anritsu Technical Review, No. 9, Dec. 1988.

Primary Examiner—Thomas G. Black
Assistant Examiner—Michael Znelli
Attorney, Agent, or Firm—Frishauf, Holtz, Goodman & Woodward

[57] ABSTRACT

A user interface unit as an operation control unit (20) is arranged between an operation panel (10) and a measuring unit (30) and includes a general purpose processing unit (21) and a memory unit (22). The general purpose processing unit (21) includes an input processing unit (S), a guidance display processing unit (T), and a determining unit (SB). Each processing unit includes individual processing units corresponding to various types of operation members (11a–11d) and display members (13, 14) falling within the range assumed to be used for various types of measuring devices, and a processing managing unit for selectively operating the individual processing units in accordance with information from the memory unit (22). The general purpose processing unit further includes a managing unit (U) for managing an operation procedure on the basis of information from the memory unit. The memory unit (22) stores determination conditions for determining validity of information as information for defining the contents for processing information from an operation member, guidance display information for guiding an operation, and an operation procedure information for determining an operation procedure.

12 Claims, 23 Drawing Sheets

OPERATION MEMBER INFORMATION

| TYPE OF OPERATION MEMBER | NAME | CODE |
|---|---|---|
| FIXED KEY | Tx FREQ<br>Rx FREQ<br>⋮<br>STANDARD<br>⋮<br>Tx<br>⋮ | 0<br>1<br>⋮<br>9<br>⋮<br>12<br>⋮ |
| F KEY | F 1<br>F 2<br>⋮<br>F 6 | $F1<br>$F2<br>⋮<br>$F6 |
| TEN KEYS ETC. | DATA 0<br>1<br>⋮ | "0"<br>"1"<br>⋮ |
| ENCODER | ENTRY | $100 |

FIG. 6A

FIXED KEY PROCEDURE INFORMATION 1

| GUIDANCE DISPLAY NO. | | 1 | | ERROR DISPLAY NO. | ABSENT |
|---|---|---|---|---|---|
| FIXED KEY | | 7 (MODE 1) | | | |
| F KEY | | ABSENT | | | |
| ENCODER | | ABSENT | | | |
| KEY | | GENERATED DATA | PROCEDURE TRANSFER DESTINATION | | DETERMINATION CONDITION NO. |
| FIXED KEYS | STANDARD | ABSENT | FIXED KEY PROCEDURE 2a | | ABSENT |
| | AUX | ABSENT | FIXED KEY PROCEDURE 2b | | ABSENT |
| | MONITOR | ABSENT | FIXED KEY PROCEDURE 2c | | ABSENT |
| | AUTO | ABSENT | F KEY PROCEDURE J1 | | ABSENT |
| | SYSTEM | ABSENT | F KEY PROCEDURE K1 | | ABSENT |
| | MEMORY | ABSENT | F KEY PROCEDURE L1 | | ABSENT |
| | PTA | ABSENT | F KEY PROCEDURE M1 | | ABSENT |

FIXED KEY PROCEDURE INFORMATION 2a

| GUIDANCE DISPLAY NO. | | 2a | | ERROR DISPLAY NO. | ABSENT |
|---|---|---|---|---|---|
| FIXED KEY | | 3 (MODE 2) | | | |
| F KEY | | ABSENT | | | |
| ENCODER | | ABSENT | | | |
| KEY | | GENERATED DATA | PROCEDURE TRANSFER DESTINATION | | DETERMINATION CONDITION NO. |
| FIXED KEYS | TX | ABSENT | F KEY PROCEDURE A1 | | ABSENT |
| | RX | ABSENT | F KEY PROCEDURE B1 | | ABSENT |
| | DUPLEX | ABSENT | F KEY PROCEDURE C1 | | ABSENT |

OPERATION PROCEDURE INFORMATION LIST

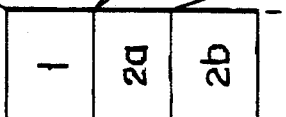

F I G. 6B

GUIDANCE · RESPONSE INFORMATION 1

| GUIDANCE MESSAGE | | | | |
|---|---|---|---|---|
| VALID OPERATING MEANS | DISPLAY LABEL | MODE 1 | | OUTPUT DEVICE CRT |
| | | RESPONSE DISPLAY | RESPONSE PROCESSING | |
| FIXED KEYS — STANDARD | ABSENT | LAMP | | ON |
| AUX | ABSENT | LAMP | | ON |
| MONITOR | ABSENT | LAMP | | ON |
| AUTO | ABSENT | LAMP | | ON |
| SYSTEM | ABSENT | LAMP | | ON |
| MEMORY | ABSENT | LAMP | | ON |
| PTA | ABSENT | LAMP | | ON |

GUIDANCE · RESPONSE INFORMATION 2a

| GUIDANCE MESSAGE | | | | |
|---|---|---|---|---|
| VALID OPERATING MEANS | DISPLAY LABEL | MODE 2 | | OUTPUT DEVICE CRT |
| | | RESPONSE DISPLAY | RESPONSE PROCESSING | |
| FIXED KEYS — TX | ABSENT | LAMP | | ON |
| RX | ABSENT | LAMP | | ON |
| DUPLEX | ABSENT | LAMP | | ON |

GUIDANCE RESPONSE INFORMATION LIST: 1 | 2a | 2b | ---

FIG. 6C

DETERMINATION CONDITION LIST

DETERMINATION CONDITIONS OF DETERMINATION CONDITION NO.1

| | | |
|---|---|---|
| OUTPUT COMMAND | 1 | |
| DISCRIMINATION BETWEEN NUMERAL/ CHARACTER STRING | NUMERAL | |
| VALID VALUE / RANGE OF DATA | LOWER LIMIT 100000 | UPPER LIMIT 500000000 |
| MAXIMUM CHARACTER NUMBER | INVALID | |
| VALID CHARACTER STRING | INVALID | |
| ERROR DISPLAY NO. | 2 | |

F I G. 8

ERROR DISPLAY INFORMATION LIST

ERROR DISPLAY INFORMATION OF ERROR DISPLAY INFORMATION NO.2

| | | |
|---|---|---|
| DISPLAY DEVICE TYPE | CRT ERROR MESSAGE AREA LAMP BUZZER | PRESENT ABSENT ABSENT |
| ERROR MESSAGE | OUT OF RANGE | |
| LAMP NO. | INVALID | |

F I G. 9

DETERMINATION CONDITION LIST

| | |
|---|---|
| 1 | |
| 2 | |
| ⋮ | |
| n | |

DETERMINATION CONDITIONS OF DETERMINATION CONDITION NO. 1

| OUTPUT COMMAND | 1 | |
|---|---|---|
| DISCRIMINATION BETWEEN NUMERAL/ CHARACTER STRING | NUMERAL | |
| VALID VALUE / RANGE OF DATA | REFERENCE CONDITION NO 1 | REFERENCE CONDITION NO 2 |
| MAXIMUM CHARACTER NUMBER | INVALID | |
| VALID CHARACTER STRING | INVALID | |
| ERROR DISPLAY NO. | 2 | |

FIG. 11

REFERENCE CONDITION LIST

| | |
|---|---|
| 1 | |
| 2 | |
| ⋮ | |
| n | |

| REFERENCE CONDITION (BEFORE UPDATING) |
|---|
| 100000 |
| 500000000 |

| REFERENCE CONDITION (AFTER UPDATING) |
|---|
| 500000000 |
| 2000000000 |

FIG. 12

OPERATION PROCEDURE INFORMATION LIST

| | |
|---|---|
| 1 | |
| 2 | |
| ⋮ | |
| n | |

OPERATION PROCEDURE INFORMATION 2

| GUIDANCE DISPLAY NO. | 2 | | ERROR DISPLAY NO. 2 |
|---|---|---|---|
| TEN KEYS | PRESENT | | |
| NUMBER OF F KEYS | 1 | | |
| KEY | GENERATED DATA | TRANSFER DESTINATION | DETERMINATION CONDITION NO. |
| TEN KEYS | | | 1 |
| F KEY a | ABSENT | 1 | ABSENT |

FIG. 13

ELECTRONIC MEASURING APPARATUS HAVING GENERAL PURPOSE PROCESSING UNIT

FIELD OF THE INVENTION

The present invention relates to an improvement in a user interface unit between a measuring unit and a user in an electronic measuring apparatus comprising an interface unit with respect to an object to be measured and the user interface unit connecting the measuring unit and the user to achieve systematization of automatic measurement.

DESCRIPTION OF THE RELATED ART

In recent years, to achieve systematization of automatic measurement, functions of an electronic measuring apparatus such as a spectrum analyzer are complicated, a number of functions are integrated, and the functions are diversified accordingly. In such an electronic measuring apparatus, processing associated with an interface with respect to a user and therefore software in computer control is diversified and complicated. Under these circumstances, users have a desire to achieve a measuring function of interest by using a desired operation system. Meanwhile, manufacturers of measuring devices are eager to supply a measuring device capable of satisfying the users+ needs as much as possible sooner.

As a technique of satisfying the above request, a user interface unit may be generalized. Such generalization of a user interface unit, however, has a problem in that operation members (individual operating means arranged on an operation panel) change in accordance with the type or application of measuring device and an operation procedure changes accordingly.

As conventional countermeasures against such software diversification, a number of man-machine interfaces and user interfaces have been invented. Examples of the inventions are Published Unexamined Japanese Patent Application No. 63-298616 (to be referred to as Prior Art 1 hereinafter) and Published Unexamined Japanese Patent Application No. 64-84322 (to be referred to as Prior Art 2 hereinafter).

Prior Art 1 aims at enabling, in an information processing system for executing processing by using an object (software object) such as a menu or an icon displayed on a screen, changes associated with the object without changing the system itself.

Prior Art 2 aims at freely changing, when users are to process set data by using a user program in an information processing system, individual input allowable values of desired set data of individual users in advance without changing the user program, and displaying the input allowable values on a screen to check in accordance with the input allowable values whether data input by users can be allowed.

Prior Arts 1 and 2 described above, however, have the following drawbacks

That is, even within a range assumed in accordance with the type of measuring device, the type of operation member to be used cannot be specified, and the type of measurement procedure and its hierarchical level to be used cannot be specified. In other words, the above basic problem in generalization is not solved at all.

In Prior Art 1, the manner in which a generated object is connected to input members or an input procedure of the information processing system is unknown.

In Prior Art 2, the input allowable values are set in correspondence with users and processed by a determining means. Since, however, such processing can be easily realized by setting a specific code of a user when the user is to utilize the system, the invention of Prior Art 2 is not special at all.

In addition, as a related art of a general measuring device, a technique called personal test automation (PTA) disclosed in "Anritsu Technical", No. 52, pp. 59 to 68 (September, 1986) and ANRITSU TECHNICAL REVIEW No. 9 as its English version is known.

That is, this PTA technique aims at effectively coping with systematization of automatic measurement, in which while programs of a user interface unit are fixed with respect to a measuring device, a memory card storing a new program in which a new measurement procedure is written is additionally used such that an execution name of the new program stored in the memory card is defined with respect to a specific operation member (more specifically, a function key) of the measuring device, thereby performing measurement.

In this PTA technique, however, an operation member or a tree structure of a measurement procedure cannot be changed in accordance with an application without remaking a new program.

SUMMARY OF THE INVENTION

It is an object of the present invention to eliminate the above conventional drawbacks and provide, in correspondence with diversification in users, needs, an electronic measuring apparatus in which a user interface unit once developed can be effectively used as commonly as possible on both user and manufacturer sides and supplied to users sooner.

That is, the present invention solves the problem in that the type of operation member to be used and the type of measurement procedure and its hierarchical level to be used change in accordance with the type and application (which is a finite range assumed in accordance with the type of device) of measuring device, and provides an arrangement in which a user interface unit can be used as commonly as possible.

In order to achieve the above object, the arrangement of the present invention is as follows (reference numerals are shown in FIGS. 1 and 2).

① Means for Generalizing Arrangement

The present invention must be able to allow operation in accordance with an operation of each operating means and a display of each display means falling within a range of predetermined types of operating means and display means assumed to be used with respect to various types of measuring device. For this purpose, according to the arrangement of the present invention, a user interface unit (to be referred to as a general purpose processing unit 21 hereinafter) is divided into a general purpose section (to be referred to as an operation control unit 20 hereinafter) for performing processing in response to all types of operating means falling within the above range and a section (to be referred to as a memory unit 22 hereinafter) for storing various types of definition information for defining contents to be processed by the general purpose processing unit and the hierarchical level of an operation procedure.

② Means for Generalizing Processing Associated with Operating Means, Display Means, and Operation Sequence (i) General Purpose Processing Unit 21

(i-1) Generalization of Processing Associated with Operating Means and Display Means The general purpose processing unit includes, as its basic arrangement, an input processing unit S for receiving information from a user via operating means to classify and identify the operating means and outputting the information in predetermined units to a measuring unit, and a guidance display processing unit T for supplying information to an operator via a display means Input processing unit S includes parallel individual input processing units ($s_1, s_2, \ldots$) each corresponding to all types of operating means falling within a predetermined range assumed to be used with respect to each type of measuring device, and an input processing managing unit $s_0$ for commanding one of the individual input processing units to process an input signal from an operating means in accordance with the contents of definition information (QS and PU) stored in the memory unit.

Similarly, the guidance display processing unit T includes parallel individual guidance display processing units ($T_1, t_2, \ldots$) each corresponding to all types of display means falling within a predetermined range assumed to be used with respect to each type of measuring device, and a guidance processing managing unit $t_0$ for commanding one of the individual guidance display processing units to perform processing in response to an operation in accordance with the contents of definition information (RT) stored in the memory unit.

(i-2) Generalization of Processing Associated with Operation Sequence

A series of processes constituted by the input processing unit S and the guidance display processing unit T described above perform processing in one hierarchical level of an operation procedure. The arrangement of the present invention further includes a managing unit U for switching the hierarchical level of an operation procedure on the basis of operation procedure information PU stored in the memory unit 22 (to be described later). That is, a hierarchical level to be switched is determined in accordance with the operation procedure information PU.

(ii) Each of the following information is written in the memory unit 22 on the basis of an operation specification including an operating means and a display means (each of which falls within the above predetermined range assumed to be used) to be actually mounted.

The memory unit 22 stores, as definition information, operation member information QS for supplying processing contents to the input processing unit S and guidance display information RT for supplying processing contents to the guidance display processing unit T. The guidance display information RT is stored in the form of a list ($rt_1, rt_2, \ldots$) in units of contents corresponding to a required hierarchical level.

The memory unit 22 also stores, in units of hierarchical levels, operation procedure information PU ($pu_1, pu_2, \ldots$) for determining a hierarchical level for a predetermined operating means. Guidance display information ($rt_1, rt_2, \ldots$) required by each hierarchical level can be obtained by referring to operation procedure information ($pu_1, pu_2, \ldots$) of the hierarchical level. Therefore, all of required guidance display information can be searched from initial operation procedure information $pu_1$.

③ If an operating means and a display means actually provided fall within a predetermined range assumed to be used, therefore, the general purpose processing unit 21 can perform processing in correspondence with the type of operating means on the basis of information from the memory unit 22. The general purpose processing unit 21 is arranged to perform processes of one hierarchical level and perform processing on the basis of the contents of each hierarchical level in correspondence with development of a tree structure having a desired operation procedure according to the operation procedure information PU from the memory unit.

In order to increase the number of types of processing functions of the general purpose processing unit 21 in addition to the above basic processing functions, an additional processing means may be arranged similarly to the input processing unit S or the guidance display processing unit T.

A typical example of the arrangement will be described below.

That is, the arrangement includes, in addition to the input processing unit S and the guidance display unit T described above, a response processing unit SA (including individual response processing units $sa_1, sa_2, \ldots$ and a response processing managing unit $sa_0$) for acknowledging a fact that an operation is performed in correspondence with an operation means to an operator, a determining unit SB (including individual analyzing units $sb_1, sb_2, \ldots$ and a response processing managing unit $sb_0$) for analyzing a signal from an operating means to check validity of the means, and an error display processing unit TA (including individual error display processing means $ta_1, ta_2, \ldots$ and an error display processing managing unit $ta_0$) for performing processing for displaying a determination result from the determining unit SB on a display means. The input processing unit S, the response processing unit SA, the guidance display processing unit T, the determining unit SB, and the error display processing unit TA are arranged in an order of processes.

These processes perform processing in one hierarchical level of an operation procedure, and an operation procedure having a tree structure can be obtained when the managing unit U switches hierarchical levels of the operation procedure on the basis of the operation procedure information PU of the memory unit 22.

In accordance with addition of the response processing unit SA, the determining unit SB, and the error display processing unit TA, the memory unit 22 additionally stores response processing information ($qsa_1, qsa_2, \ldots$), determination conditions ($qsb_1, qsb_2, \ldots$), and error display information ($rta_1, rta_2, \ldots$). Each information is referred from operation procedure information ($rta_1, rta_2, \ldots$).

The general purpose processing unit 21 is constituted by a memory storing execution programs in which the manner of each processing described above is described and a CPU for executing the programs.

According to the above arrangement of the present invention, a manufacturer need only supply the memory unit 22 having contents corresponding to various requests of individual users with respect to each type of electronic measuring apparatus. In addition, even if an operation panel (including a user input operation unit and a display unit) and a measuring unit are changed in accordance with the type of electronic measuring apparatus, the general purpose processing unit 21 can be commonly used and the stored contents of the memory unit 22 need only be changed in an operation control unit.

If a part of each information stored in the memory unit 22 can be rewritten from the measuring unit, the memory unit need not be replaced upon unit replacement.

According to the present invention, therefore, individual users can obtain measuring devices corresponding to their own applications and having good operability. In addition, manufacturers can massproduce measuring devices since the types of devices are standardized. Furthermore, software need not be revised nor corrected. That is, the present invention can improve productivity in both users and manufacturers of an electronic measuring apparatus.

The above advantages of the present invention are obtained by specific techniques of the present invention not disclosed in Prior Arts 1 and 2 described above. That is, a hierarchical level having a specific tree structure (a kind of a software structure associated with a user interface) is given to an operation procedure in units of different types of measuring devices, and desired measurement can be performed by development of a procedure according to development of the tree.

BRIEF DESCRIPTION OF THE DRAWINGS

FIGS. 6A, 6B, and 6C are views showing the contents of operation member information, an operation procedure information list, and a guidance response information list, respectively, used in the first embodiment of the present invention;

FIGS. 8 and 9 are views showing the contents of a determination condition list and an error display information list, respectively, used in the first embodiment of the present invention;

FIGS. 11 to 13 are views showing the contents of a determination condition list, a reference condition list, and operation procedure information, respectively, used in the second embodiment of the present invention.

DETAILED DESCRIPTION OF THE EMBODIMENTS

FIRST EMBODIMENT

I. Description of Arrangement

Figure 1:
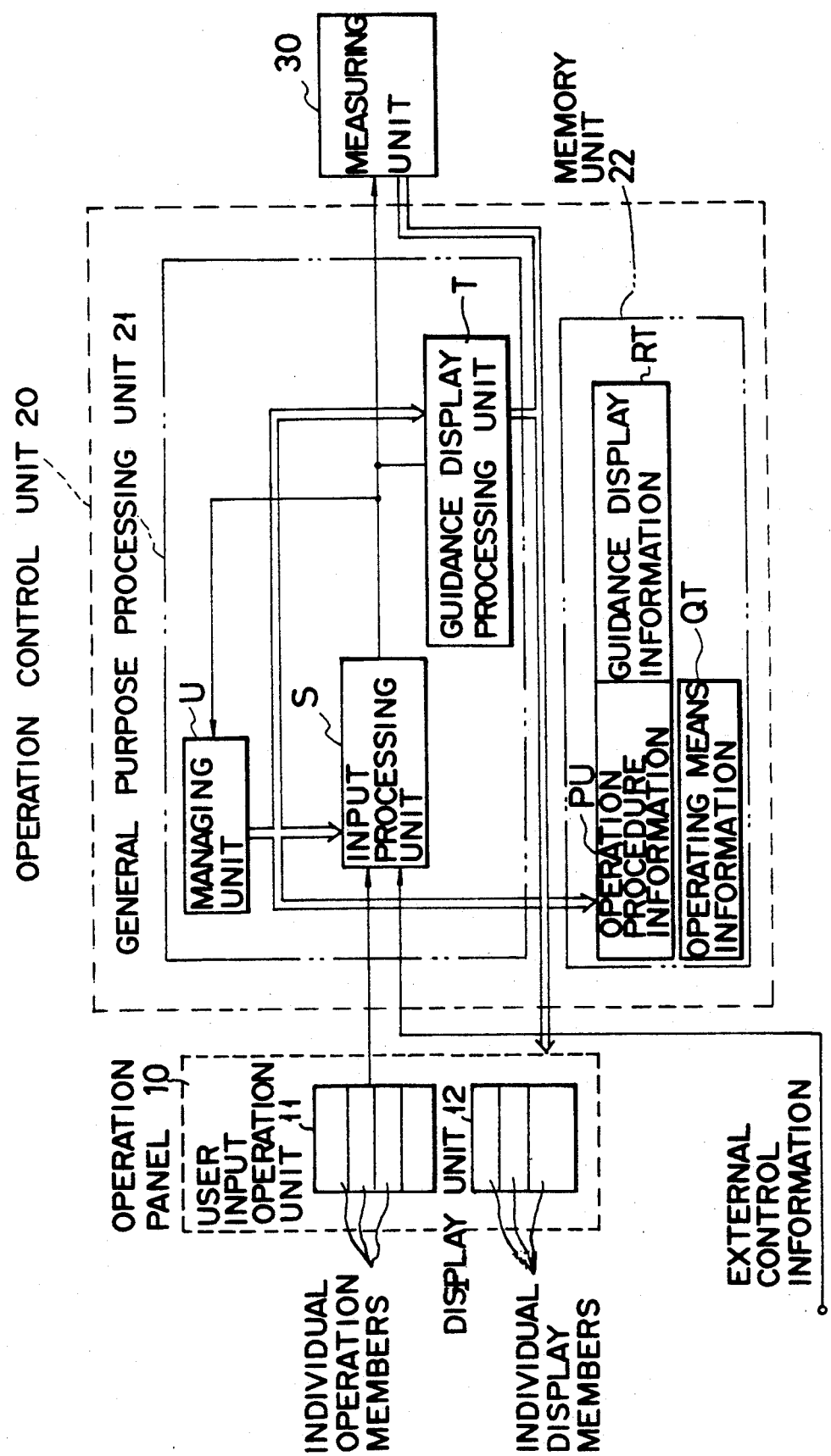
FIG. 1 is a schematic block diagram showing an arrangement of the first embodiment of an electronic measuring apparatus according to the present invention.

FIG. 1 shows a schematic arrangement of an electronic measuring apparatus according to the first embodiment of the present invention. FIGS. 2A to 2D show detailed practical arrangement based on the arrangement shown in FIG. 1 and having additional types of processing. Referring to FIGS. 1 and 2A-2D, each connection line constituted by a single solid line and an arrow indicates a flow of information associated with user input information from a user input operation unit 11, and each connection line constituted by two parallel lines and an arrow indicates a flow of information for control. Operating means information QT shown in FIG. 1 is shown as operation member information QS in FIGS. 2A to 2D.

Since all constituting elements shown in FIG. 1 are included in FIGS. 2A to 2D, the arrangement will be described below with reference to FIGS. 2A to 2D.

(1) Operation Panel

Referring to FIGS. 2A to 2D, an operation panel 10 includes a user input operation unit 11 having predetermined types of individual operation members (11a to 11d) required by a user to set input information such as measurement conditions as will be described later, and a display unit 12 having predetermined types of individual display members (13 and 14) required to display guidance display information supplied to a user for an operation and measurement data.

In FIGS. 2A to 2D, an operation control (user interface) unit 20 is constituted by a general purpose processing unit 21 and a memory unit 22.

(2) Outline of General Purpose Processing Unit 21

The general purpose processing unit 21 has a basic arrangement required for an interface function between a user and a measuring unit 30. That is, the general purpose processing unit 21 includes an input processing unit S for receiving input information supplied from a user via an individual operation member of the user input operation unit 11 of the operation panel 10 and classifying and identifying the information to output operation information in a predetermined unit, a guidance display processing unit T for giving display information to a user via an individual display member, and a managing unit U for switching a hierarchical level of an operation procedure on the basis of operation procedure information PU of the memory unit 22 (to be described later). The arrangement of this embodiment further includes a response processing unit SA for performing display processing for acknowledging a fact that an individual operation member is operated by a user, a determining unit SB for analyzing the operation information from the input processing unit to check validity of the information, and an error display processing unit TA for performing processing for displaying a determination result from the determining unit SB on the display member.

Each of the above processing units has individual processing members associated with individual operation members and display members falling within a predetermined range assumed to be used so that the processing unit can be applied to measuring devices of different types. These individual processing members are selectively operated in accordance with the type of measuring device or the hierarchical level of an operation procedure of measurement on the basis of information stored in the memory unit 22, thereby performing processing in accordance with the type of measuring device and the hierarchical level of an operation procedure.

(3) Practical Arrangement and Operation of General Purpose Processing Unit 21

Figure 3A:
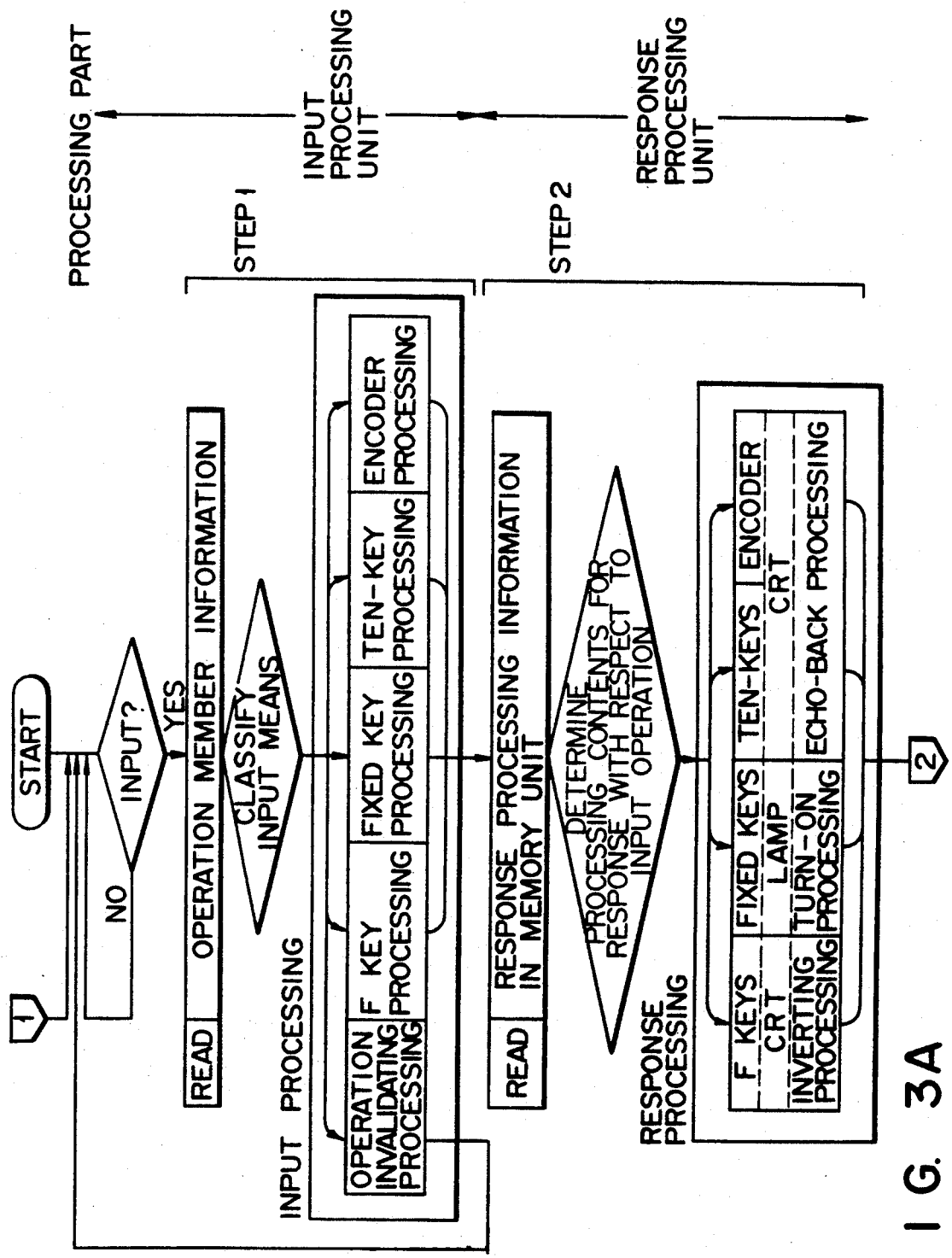
FIGS. 3A, 3B, 3C, and 3D are flow charts for explaining operations of the general purpose processing unit shown in FIGS. 1 and 2.
Figure 3B:
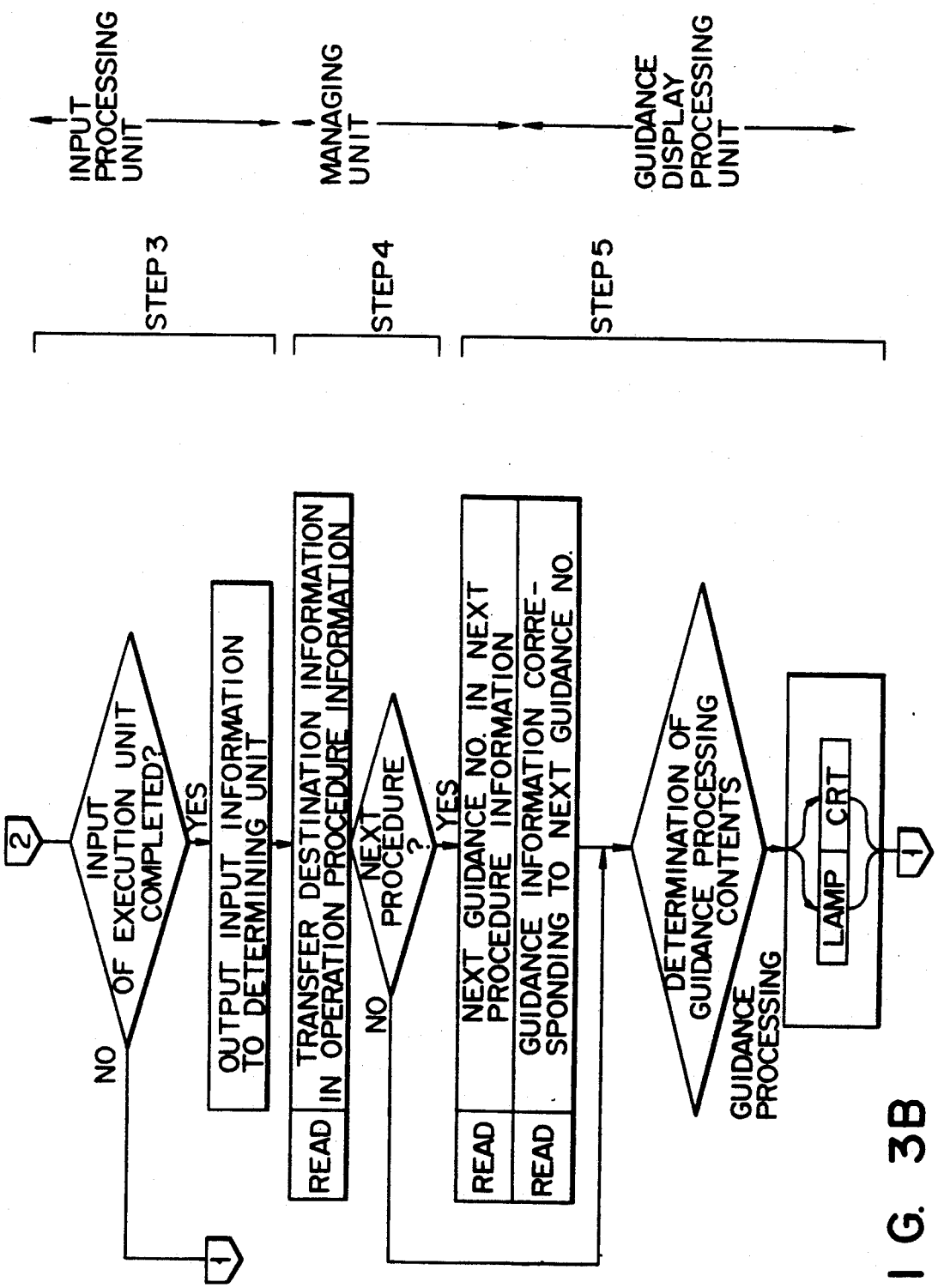
Figure 3C:
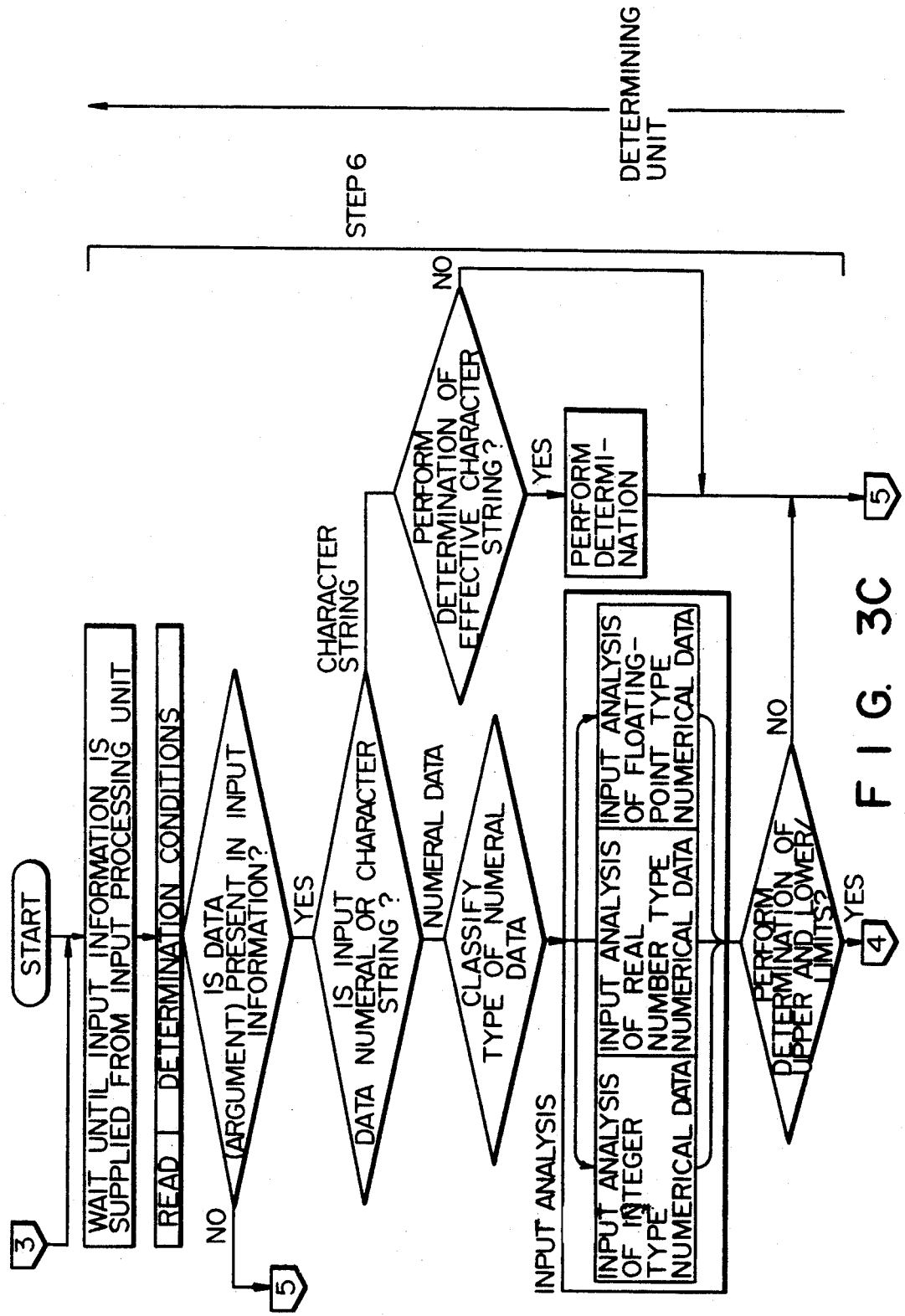
Figure 3D:
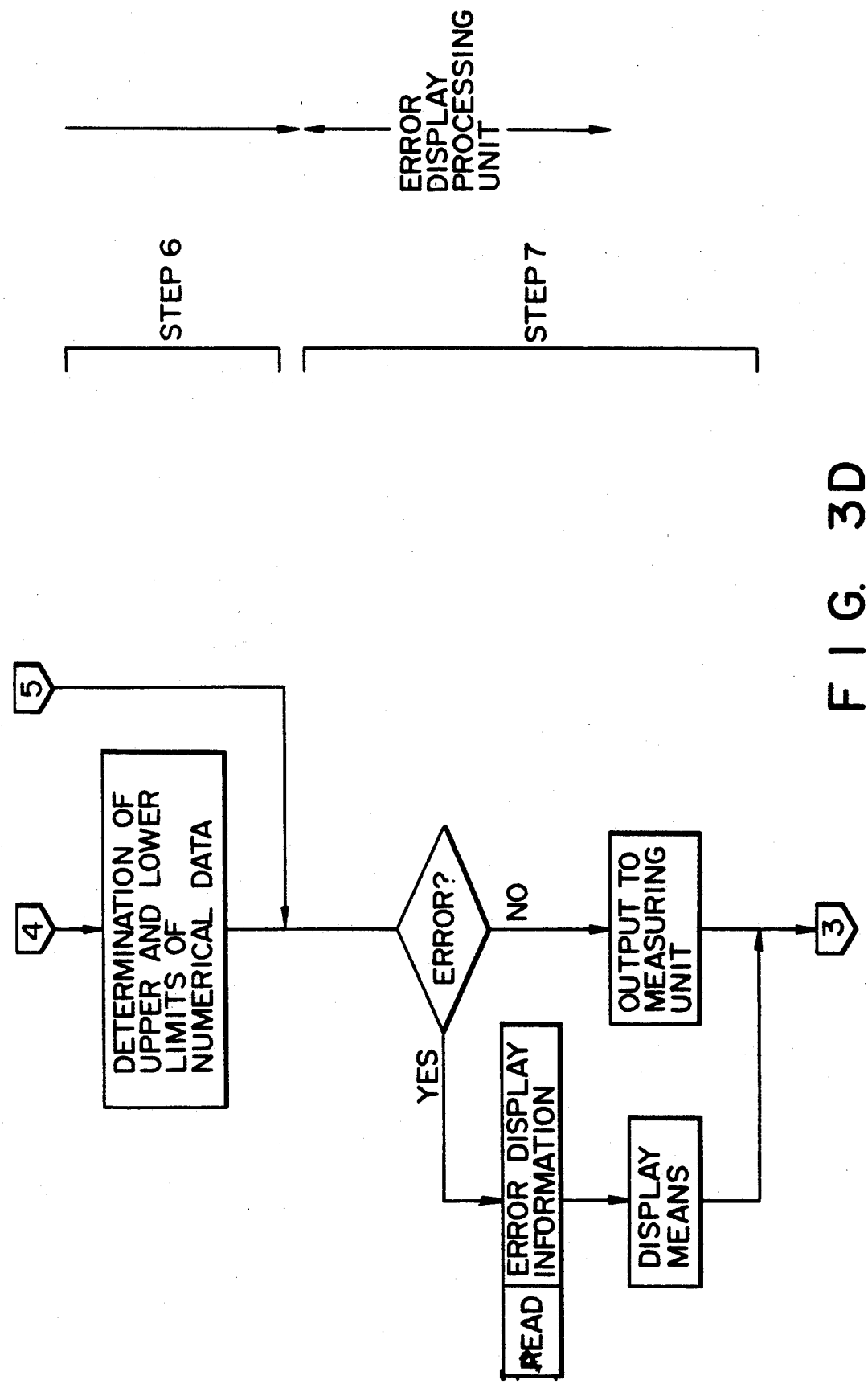

An operation flow of the general purpose processing unit 21 is shown in FIGS. 3A, 3B, 3C, and 3D. That is, FIGS. 3A, 3B, 3C, and 3D as a whole show a flow of a processing operation corresponding to one hierarchical level of an operation procedure. Processing contents of a certain hierarchical level are determined by definition information supplied from the memory unit 22. For example, processing associated with an operation of fixed keys 11a as one of the individual operation members is performed in a certain hierarchical level in accordance with a route associated with fixed keys shown in FIGS. 3A and 3B, and processing for F keys 11b is performed in the next hierarchical level in accordance with a route associated with F keys shown in FIGS. 3A and 3B. FIGS. 3C and 3D show an operation flow for determining validity of input information to transmit a processing request to the measuring unit.

The arrangement of the general purpose processing unit 21 will be described below with an emphasis on versatility. A step number in parentheses indicates that an operation of this arrangement is performed in a corresponding one of step numbers shown in FIGS. 3A and 3B.

Note that an operation to be performed when a specific measuring device is mounted will be described in detail in item II below.

As shown in FIGS. 2A to 2D, the input processing unit S includes parallel individual input processing units (a fixed key input processing unit $s_1$, a soft key input processing unit $s_2$, a ten-key input processing unit $s_3$, an encoder input processing unit $s_4$, and an up/down key input processing $s_5$) corresponding to types of all operation members falling within a predetermined range assumed to be used in accordance with each type of measuring device. When the operation panel is operated, an input processing managing unit $s_0$ classifies the type of input means on the basis of definition information (operation member information QS) stored in the memory unit and causes an individual input processing unit to convert input information and output an internal code indicating the type and identification of the input means. Note that if input information is invalid in a current stage of an operation procedure, operation invalidation processing is performed, and an operation of a user is waited.

Step 1

In addition, since a series of input information (information of an execution unit) having a specific meaning may be input by a plurality of operations such as ten keys, whether an input operation is finished by an execution unit is checked. If the input operation is completed, input information is output to the determining unit, and the flow advances to the next processing. If the input operation is not completed, the next input operation is waited.

Step 3

Note that in FIGS. 3A and 3B, processing timings of steps 2 and 3 may be the same or different.

The response processing unit SA performs display processing for acknowledging a fact that an operation member is operated or input information input by the operation to a user in accordance with the operated operation member. A response processing managing unit $sa_0$ causes one of individual response processing units (a fixed key response processing unit $sa_1$, a soft key response processing unit $sa_2$, a ten-key response processing unit $sa_3$, an encoder response processing unit $sa_4$, and an up/down key response processing unit $sa_5$) on the basis of definition information (response processing information QSA) stored in the memory unit.

Step 2

The managing unit U switches a hierarchical level of an operation procedure on the basis of operation procedure information PU in the memory unit 22 and causes the guidance display processing unit T to refer to the next operation procedure information PU and receive and display the next guidance information.

Steps 4 and 5

The guidance display processing unit T includes parallel individual guidance display processing units (a lamp indicator $t_1$, a CRT display $t_2$, and a 7-segment display $t_3$) corresponding to types of all display means falling within a predetermined range assumed to be used in accordance with each type of measuring device. A guidance display processing managing unit $t_0$ causes one of the individual display processing units to display the contents (guidance display information RT) of definition information stored in the memory unit in correspondence with the operation.

Step 5

The determining unit SB receives and analyzes input information from the input processing unit and checks validity of the information. In this processing, a determination processing managing unit $sb_0$ causes individual analyzing units (a character string data analyzing unit $sb_1$, an integer type numerical data analyzing unit $sb_2$, a real number type numerical data analyzing unit $sb_3$, and a floating-point type numerical data analyzing unit $sb_4$) to analyze the input information on the basis of definition information (determination condition QSB) stored in the memory unit and causes individual determining units (a valid character string determining unit and a numerical data upper/lower limit determining unit) to check validity of the input information.

Step 6

The error display processing unit TA performs processing for displaying the determination result from the determining unit SB on a display member. In this processing, an error display processing managing unit $ta_0$ causes individual error message processing units (a lamp indicator $ta_1$, a CRT display $ta2$, and a 7-seg display $ta_3$) to perform the processing on the basis of definition processing (error display information RTA) stored in the memory unit 22.

Step 7

The process in the general purpose processing unit 21 is performed in an order of the input processing unit S, the response processing unit SA, the guidance display processing unit T, the determining unit SB, and the error display processing unit TA.

(4) Memory Unit 22

Each of the following information is written in the memory unit 22 on the basis of operation specifications of operation members (in this embodiment, fixed keys, soft keys, ten keys, and an encoder) and display members (in this embodiment, a CRT and lamps) to be actually mounted.

As described above, the operation member information QS associated with the input processing unit S, the guidance display information RT associated with the guidance display processing unit T, the response processing information QSA associated with the response processing unit SA, the determination condition QSB associated with the determining unit SB, and the error display information RTA associated with the error display processing unit TA are stored as the definition information. These pieces of information except for the operation member information QS are stored in the form of a list ($qsa_1$, $qsa_2$, ...; $rT_1$, $rt_2$, ...; $qsb_1$, $qsb_2$, ...; and $rta_1$, $rta_2$, ...) in units of contents required for this hierarchical level in an operation procedure. Each information is referred from operation procedure information ($pu_1$, $pu_2$, ...) of each hierarchical level.

In addition, the memory unit 22 stores, in units of hierarchical levels, operation procedure information PU ($pu_1$, $pu_2$, ...) for determining a hierarchical level for a predetermined operation member. The above information except for the operation member information required for a certain hierarchical level can be obtained by referring to the operation procedure information ($pu_1$, $pu_2$, ...) of the hierarchical level. Therefore, all the required information except for the operation member information in the memory unit 22 can be obtained from the initial operation procedure information $pu_1$.

(5) Measuring Unit 30

The measuring unit 30 comprises one or a plurality of measurement processing units serving as a measurement executing unit and constituted by a circuit functional element and a circuit, and a measurement managing unit for managing the measurement processing units to allow systematic operation. The measuring unit 30 is externally controlled to execute desired measurement.

In the above arrangement, the general purpose processing unit 21 comprises a CPU and a memory for storing programs for execution. FIGS. 1 and 2A to 2D are block diagrams showing the arrangement in correspondence with functions.

II. Description of Embodiment in Actual Measuring Device (1) Arrangement

Figure 4A:
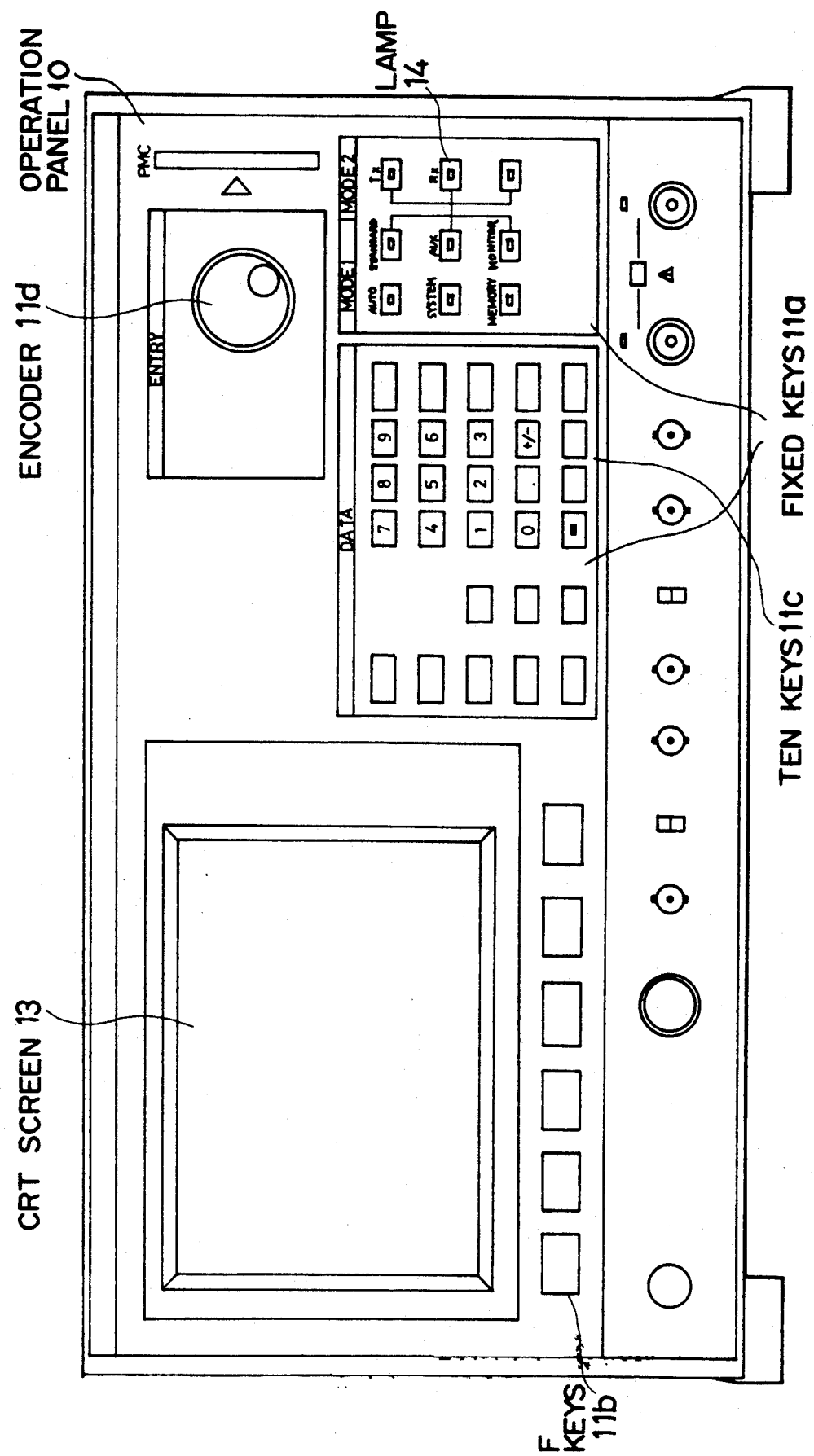
FIG. 4A is a view showing an operation panel of an electronic measuring apparatus according to the first embodiment of the present invention.

FIG. 4A shows an operation panel 10 of an electronic measuring apparatus to which the present invention is actually applied. This electronic measuring apparatus is a tester for testing a radio transmitter (denoted by reference symbol $T_x$) and a radio receiver (denoted by reference symbol $R_x$).

Figure 4B:
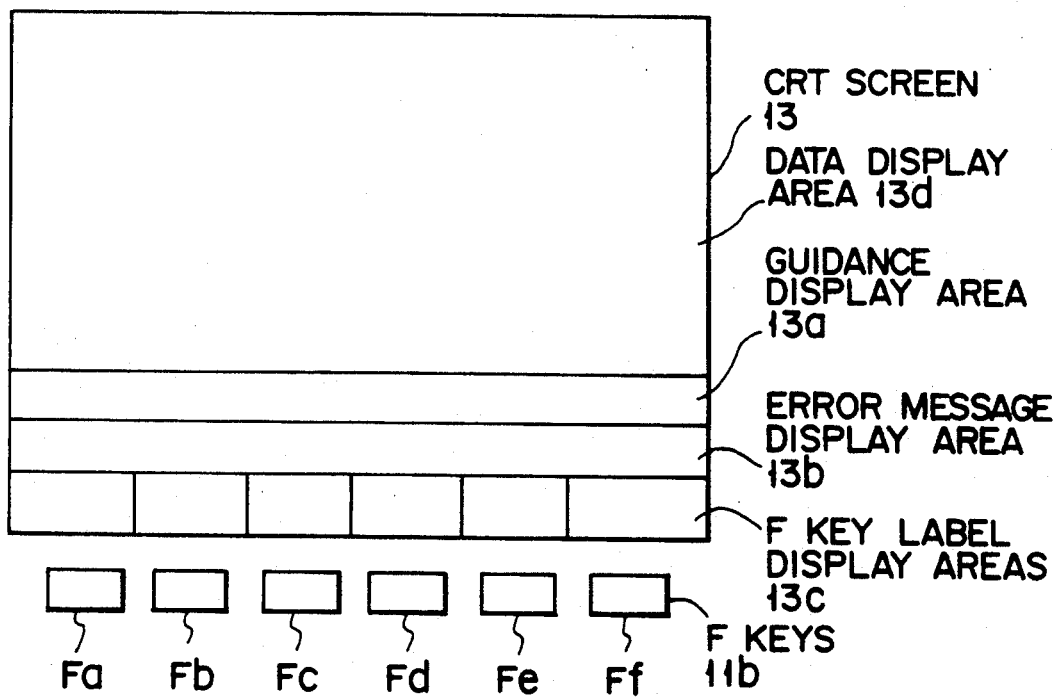
FIG. 4B is a view showing a display area of a CRT screen 13 shown in FIG. 4A.

Referring to FIG. 4A, a user input operation unit 11 includes fixed keys 11a and function keys 11b (also called soft keys since the keys are defined by software; to be abbreviated to as F keys hereinafter) for setting functions, and ten keys 11c and a rotary encoder (to be referred to as an encoder hereinafter) 11d for setting numerical data of measurement conditions. A display unit 12 includes a CRT screen 13 and lamps 14. As shown in FIG. 4B, the CRT screen 13 is constituted by a guidance display area 13a, an error message display area 13b, F key (function key) label display areas 13c, and a data display are a 13d for displaying measurement data. These display areas are assigned by the general purpose processing unit 21, and the contents of the areas depend on information read out from the memory unit 22.

Since this arrangement does not include an up/down key and a 7-segment display, processing information associated with an up/down key and a 7-segment display buzzer need not be stored in the memory unit 22. Since, therefore, operations are not defined by information from the memory unit 22 with respect to an up/down key and a 7-segment display, the general purpose processing unit 21 does not perform any processing for an up/down key and a 7-segment display in the operation flow shown in FIGS. 3A, 3B, 3C, and 3D.

(2) Operation Procedure

Figure 5A:
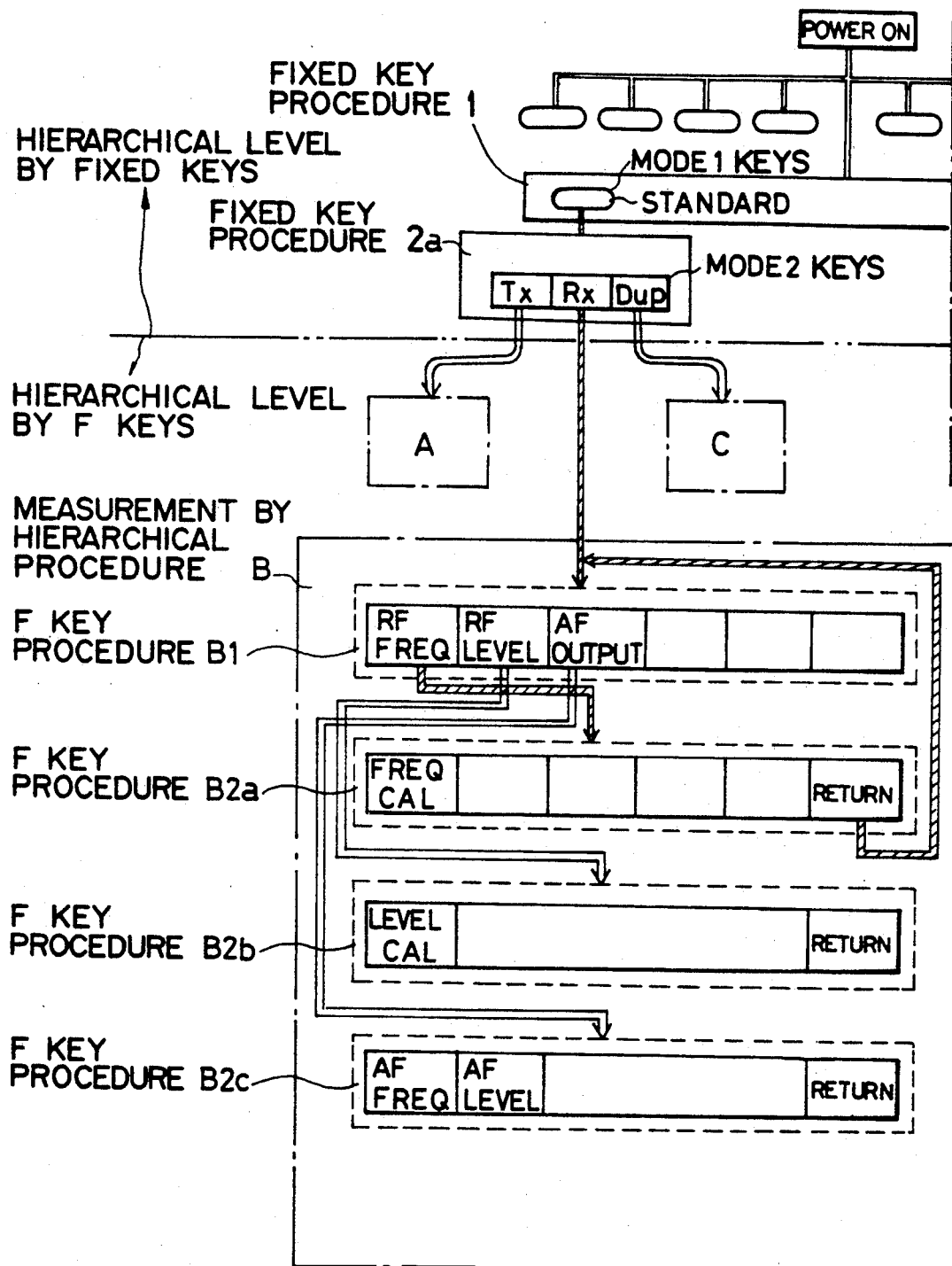
FIGS. 5A, 5B, and 5C are views showing operation procedures having tree structures according to the first embodiment of the present invention.
Figure 5B:
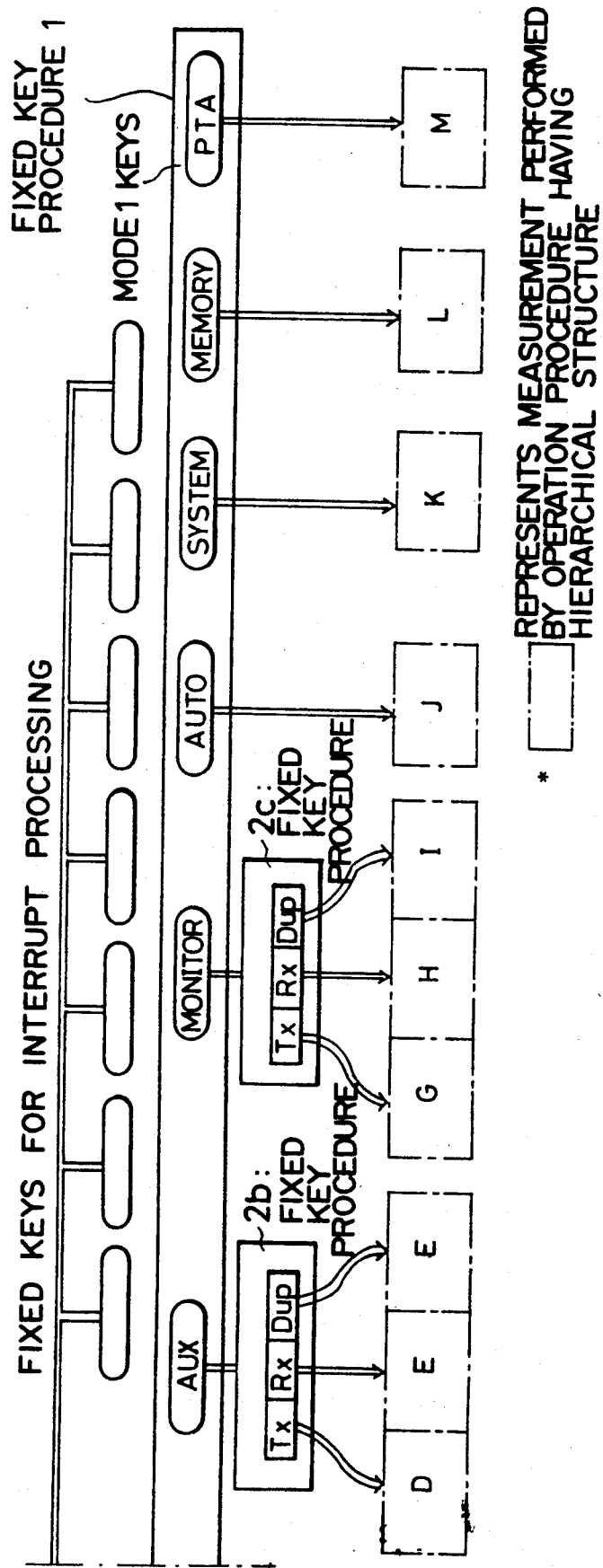

FIGS. 5A and 5B show a practical operation procedure having a tree structure.

Referring to FIG. 5A, hierarchical levels located above an alternate long and two dashed line are set by the fixed keys 11a arranged on the operation panel 10. A fixed key procedure 1 as a first hierarchical level is set for MODE1 keys upon initialization performed when a power source is switched on, and a fixed key procedure 2 as a second hierarchical level is set for MODE2 keys when STANDARD of the MODE1 keys is selected.

Referring to FIG. 5A, hierarchical levels located below the alternate long and two dashed line are set by the F keys 11b arranged on the scanning panel 10.

Figure 5C:
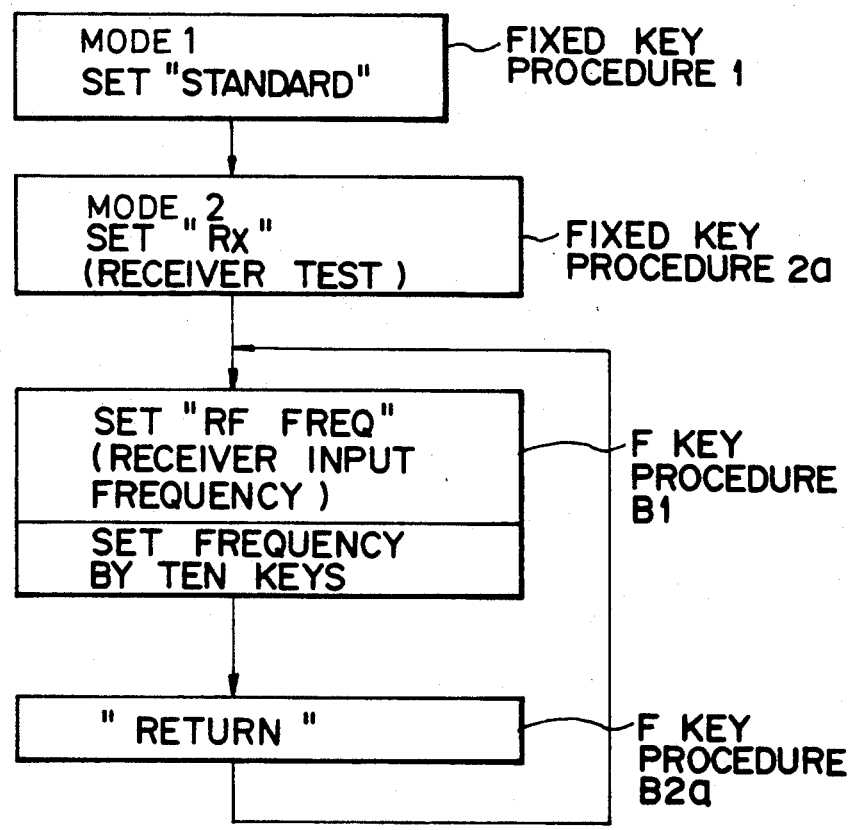

In this case, as shown in FIG. 5A, in order to test the receiver $R_x$, the [STANDARD] key is selected in the fixed key procedure 1 as the first hierarchical level set for the MODE1 keys, and an [$R_x$] key is selected in the fixed key procedure 2a as the second hierarchical level set for the MODE2 keys. Subsequently, [RF FREQ] is selected in an F key procedure B1 as a third hierarchical level in order to enable setting of a frequency of an RF signal to be transmitted to the receiver Rx of the measuring device, and the frequency is set by the ten keys in an F key procedure B2a as a fourth hierarchical level. Thereafter, [RETURN] for returning the hierarchical level of the operation procedure to the original level is selected in the same fourth hierarchical level. FIG. 5C shows the above operation in the form of a flow chart.

(3) Information in Memory Unit 22

Figure 2A:
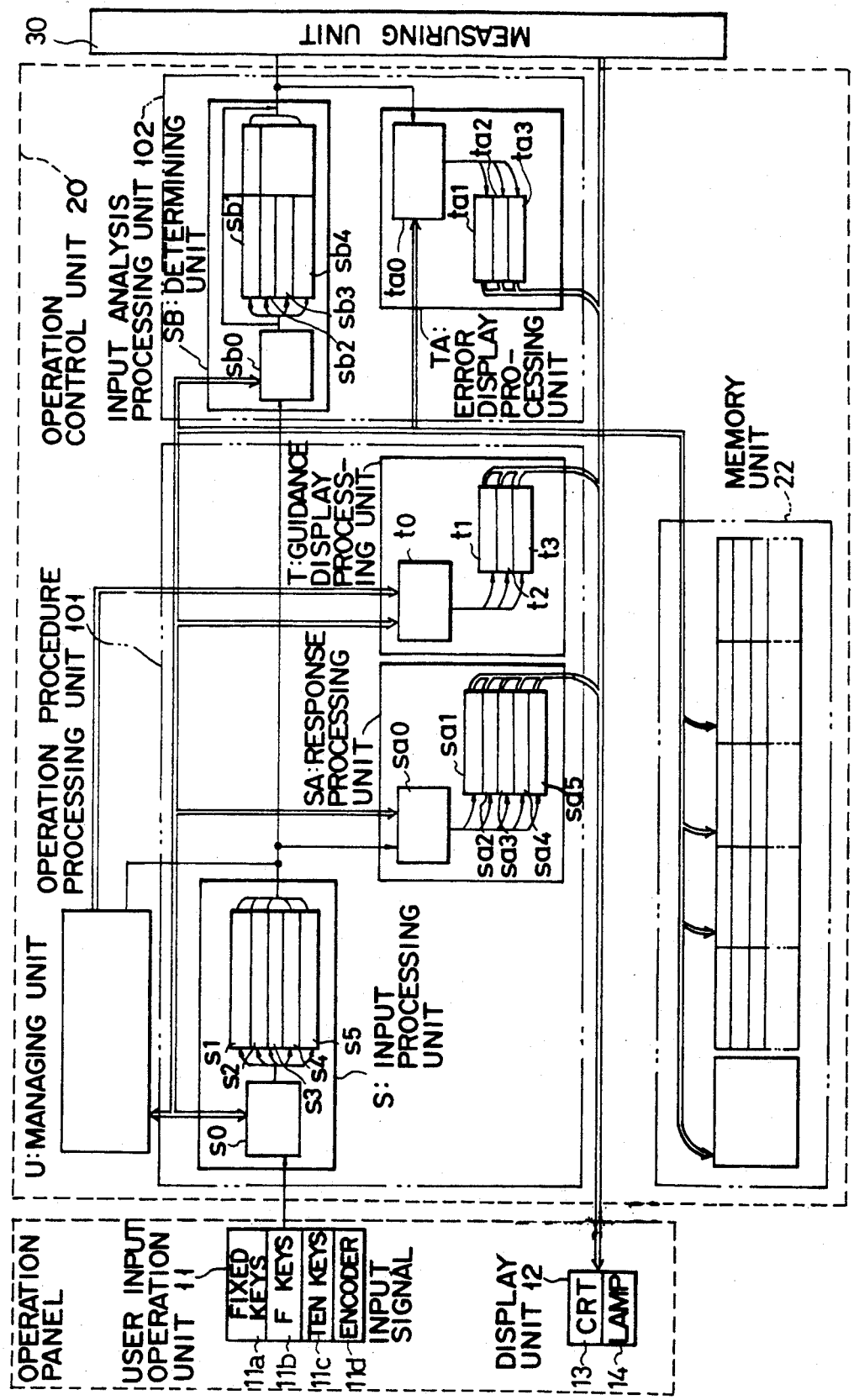
FIG. 2A is a block diagram for explaining the arrangement shown in FIG. 1 in detail.
Figure 2B:
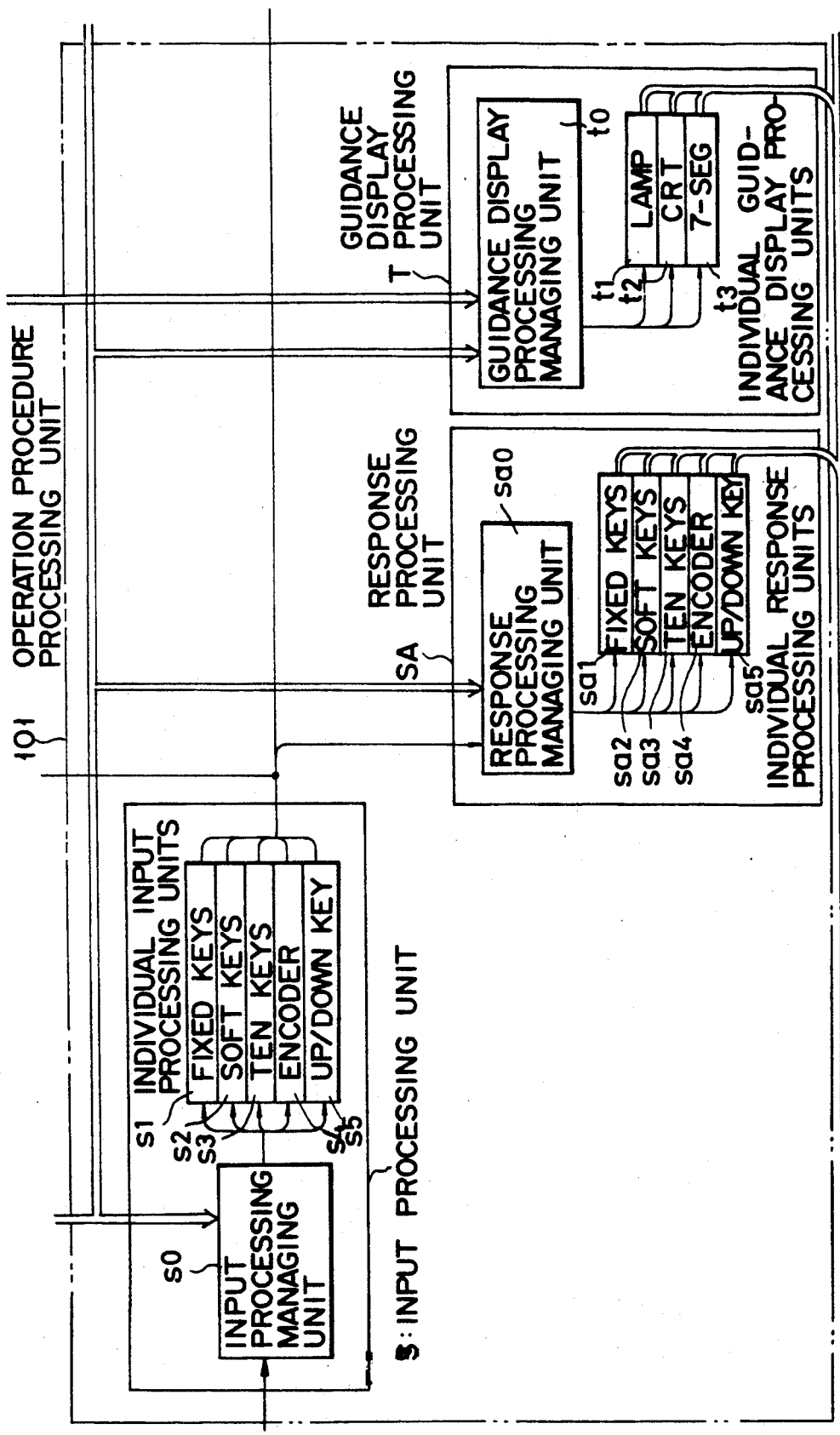
FIGS. 2B, 2C, and 2D are block diagrams showing parts of a general purpose processing unit shown in Fig. 2A in detail.
Figure 2C:
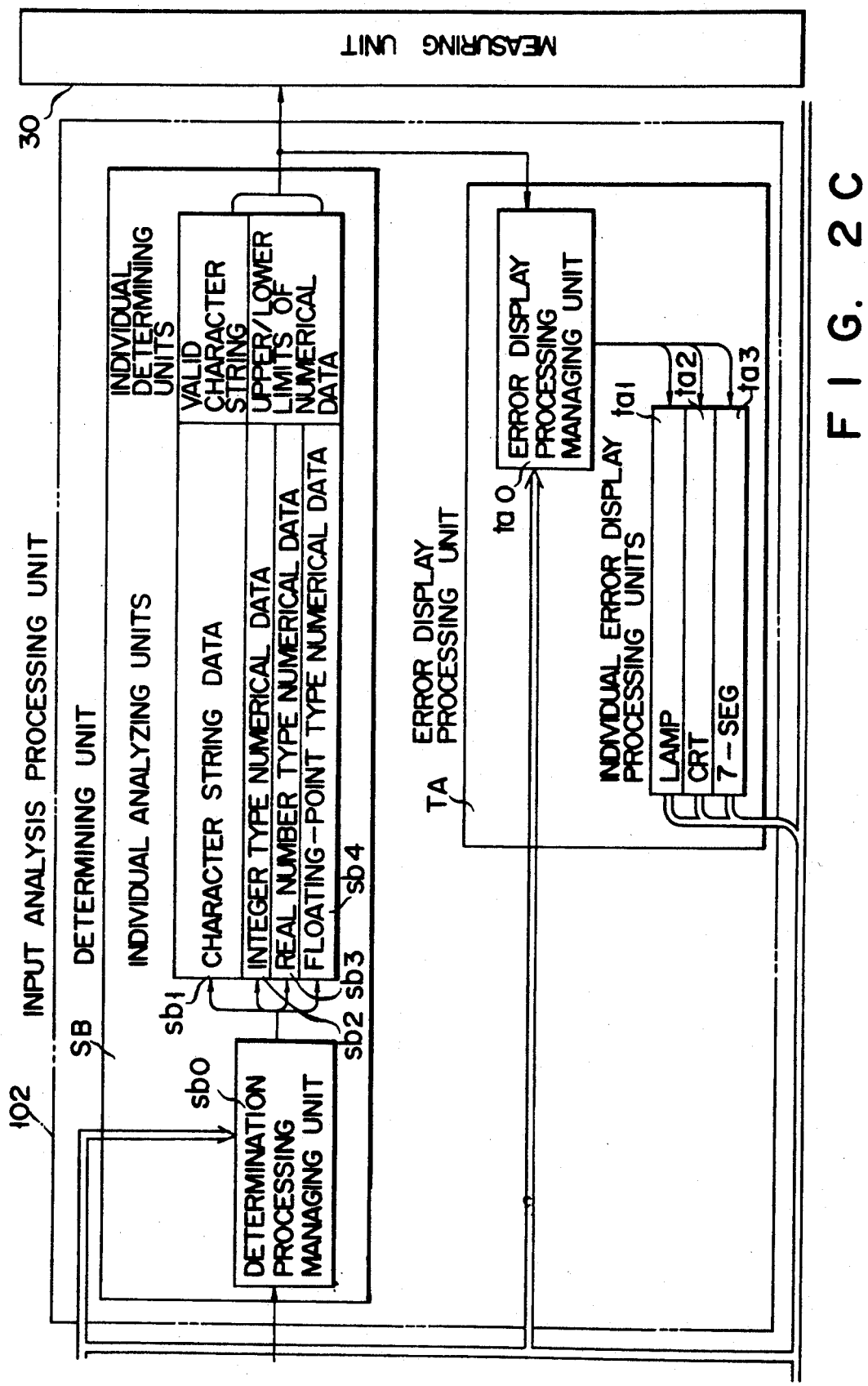
Figure 2D:
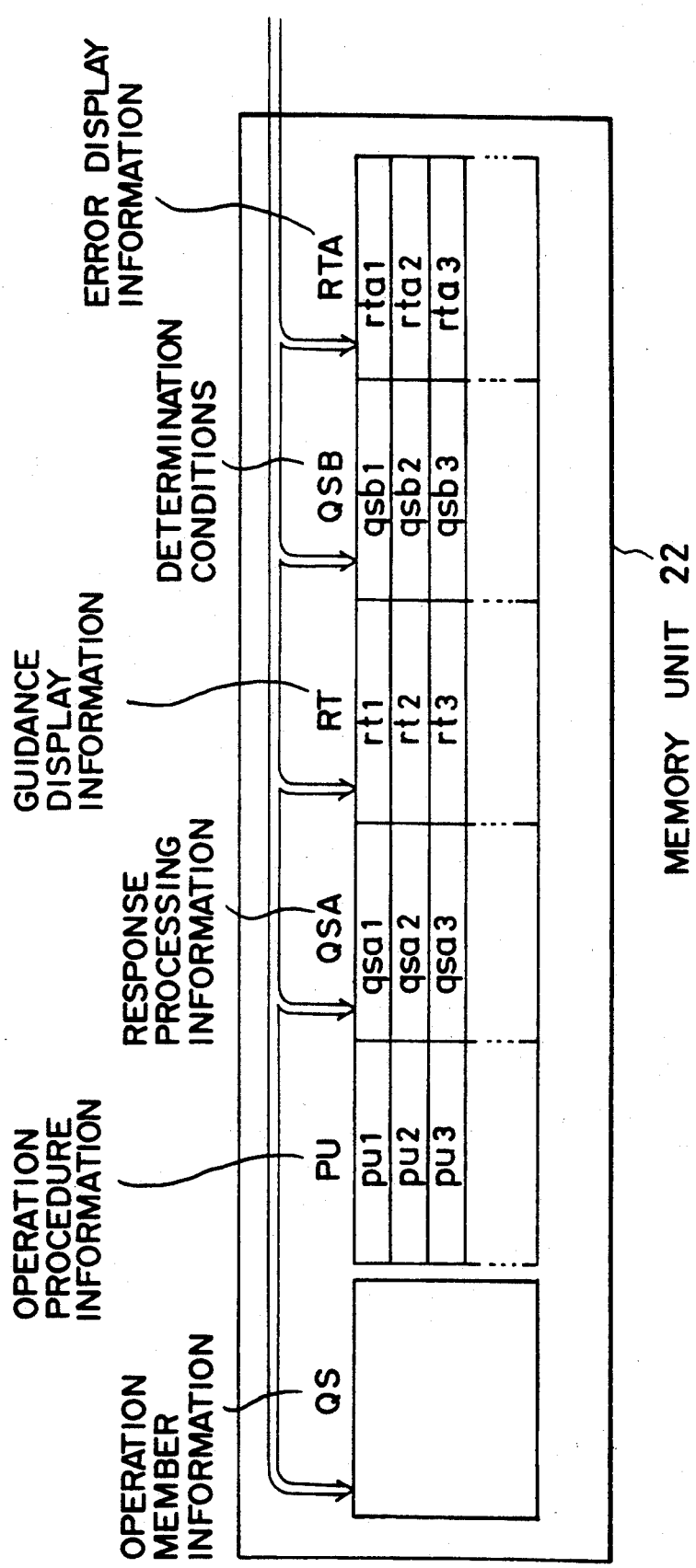

FIG. 6A shows definition information for coding input information in correspondence with operation members (individual operating means arranged on the operation panel) shown in FIG. 2D on the basis of the operation member information QS. This information has no relation to a hierarchical level of an operation procedure.

FIG. 6B shows operation procedure information defined with respect to the fixed key procedures 1 and 2a shown in FIG. 5A. This information corresponds to the information represented by $pu_1$ and $pu_2$ in the general form in FIG. 2D. Fixed key procedure information 2a is read out by referring to "PROCEDURE TRANSFER DESTINATION" associated with the fixed key [STANDARD] in fixed key procedure information 1. In the fixed key procedure information 1, list numbers (Nos.) of information required by the general purpose processing unit to perform processing in the hierarchical level of the fixed key procedure 1, i.e., the guidance display information, the error display information, and the determination conditions are described so that each information can be read out. In addition, a procedure transfer destination selected when each fixed key included in the MODE1 keys is selected is defined as information for determining the next hierarchical level in the fixed key procedure information 1. In the fixed key procedure information 2a, information as the next hierarchical level of the fixed key procedure 1 is included, and a procedure transfer destination selected when each fixed key included in the MODE2 keys is selected is defined.

Although not shown in FIG. 6B, an output command to be output in correspondence with an operation of each fixed key is also included. If an operation is only an action, the output command is determined to be "ABSENT" and is not output to the measuring unit.

FIG. 6C shows guidance response information 1 and 2a including both the guidance display information ($rt_1$ and $rt_2$) and response processing information ($qsa_1$ and $qsa_2$) among information to be read out by referring to the fixed key procedure information 1 and 2a. Items of response display and response processing of the guidance-response information 1 are information for turning on a lamp corresponding to a set fixed key.

Figure 7A:
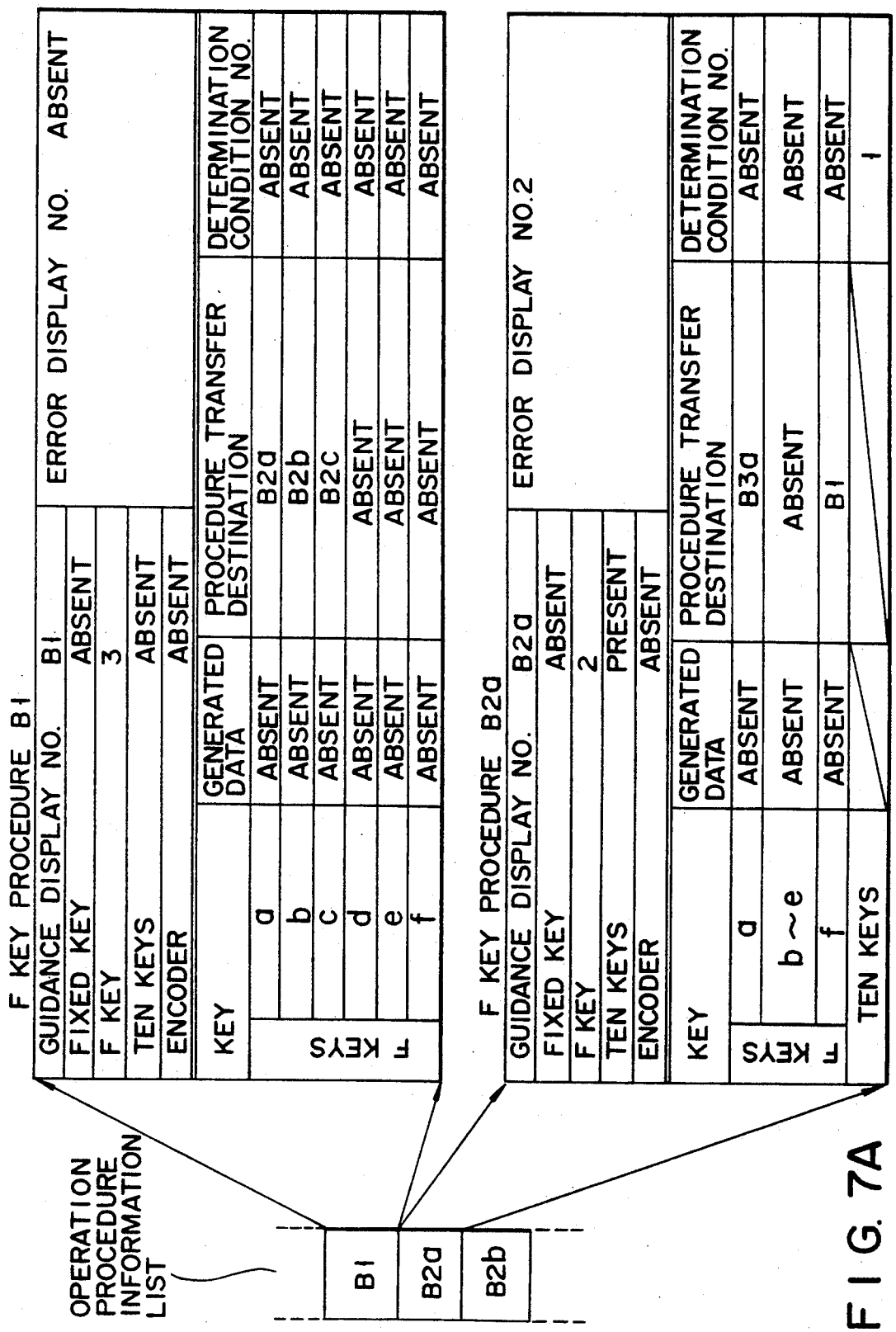
FIGS. 7A and 7B are views showing the contents of an operation procedure information list and a guidance response information list, respectively, used in the first embodiment of the present invention.

FIG. 7A shows F key procedure information B1 to be read out by referring to the fixed key procedure information 2a and F key procedure information B2a to be read out by referring to the F key procedure information B1.

Figure 7B:
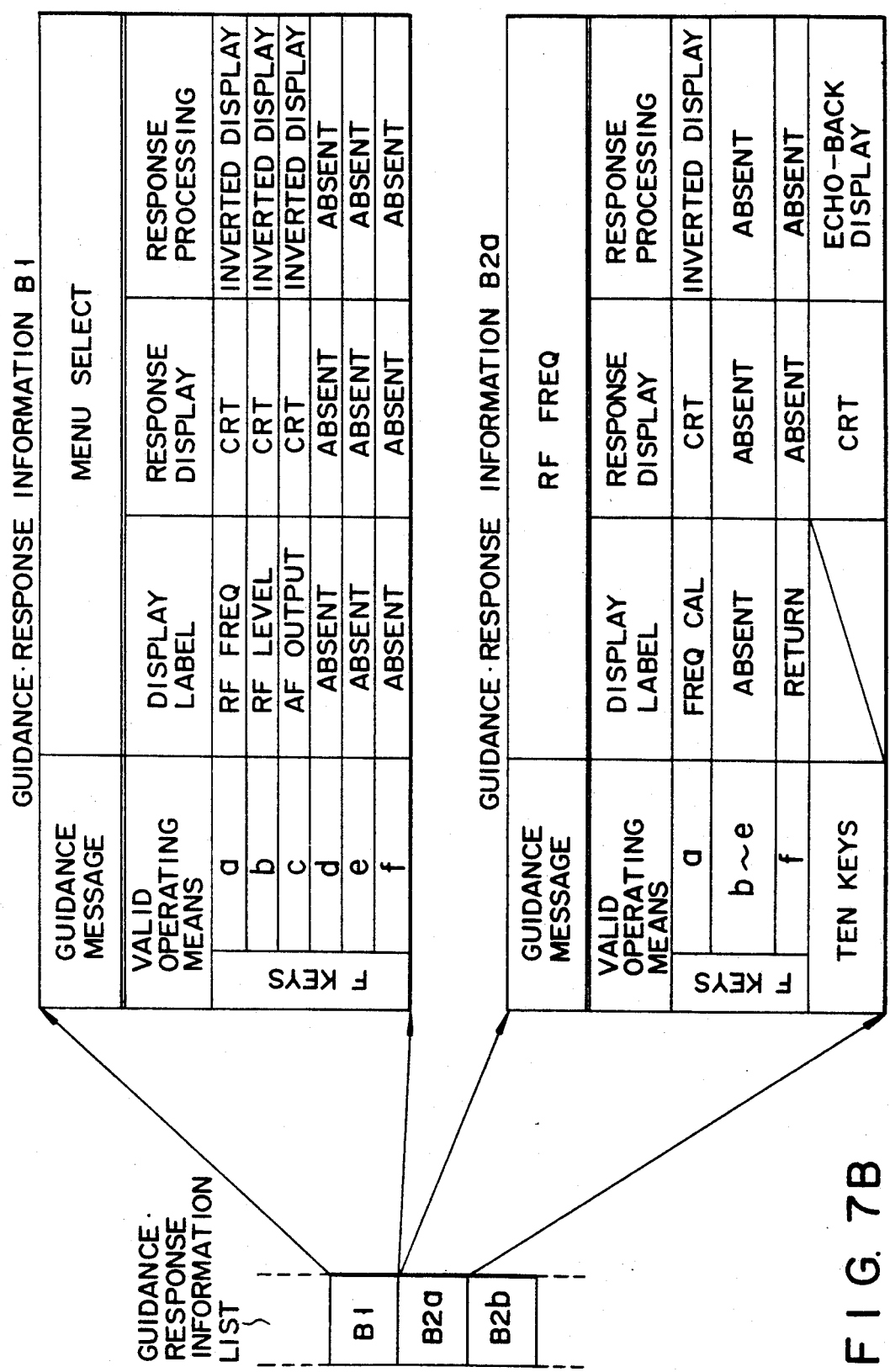

FIG. 7B shows guidance-response information B1 and B2a to be read out by referring to the F key procedure information B1 and B2a. Since an F key is defined and used for each hierarchical level of an operation, a display label of the guidance-response information B1 is information for displaying the name of a defined function in the F key label display area BC of the CRT screen 13. If response processing in the guidance-response information B2 corresponding to the ten keys is "ECHO BACK DISPLAY", when a user inputs numerical data from the ten keys 11c, an input numeral is displayed each time the ten keys are operated so that the user can confirm the input numeral.

FIGS. 8 and 9 show a determination condition No. 1 and error display information No. 2 which are read out from the F key procedure information B2a. In the determination condition No. 1, an item of an output command defines that a command of "1" is output when a determination result is valid. The output command is output as integral data. In addition, discrimination between a numeral/character string, a valid value/range of data, a maximum character number, and a valid character string are defined as determination items. That is, if user input information is a number, the item of discrimination between the numeral/character string is defined as "NUMERAL", and a valid value and a valid range of the numeral are defined in the item of valid value/range. If user input information is to be a character string, "CHARACTER STRING" is defined in the item of discrimination between the numeral/character string, and a maximum character number and a valid character string are defined.

If a character string "100" is defined in an item of generated data of a certain key, for example, generated data shown in FIGS. 6B and 7A is information for replacing user input information input from the key with the character string "100", thereby obtaining the same result as that obtained when the ten keys are operated in an order of "1", "0", and "0". This information processing can be assigned to the input processing unit S of the general purpose processing unit 21. In other words, this processing is a data conversion function.

(4) Description of Series of Operations

Operations of the electronic measuring apparatus according to this embodiment performed when the operation shown in the flow chart of FIG. 5C is executed will be described below with reference to mainly FIGS. 2 to 9.

① Initial Operation

When a power switch is turned on, the managing unit U reads out the fixed key procedure information 1 as the head information of the operation procedure information list shown in FIG. 6B from the memory unit 22 and acknowledges that the guidance-display No. in an initial hierarchical level is "1" to the guidance display processing managing unit $t_0$. The guidance display processing managing unit $t_0$ reads out the guidance-response display information No. 1 shown in FIG. 6C and causes the CRT display-individual guidance display processing unit $t_2$ to display a guidance message "MODE1" in the guidance display area 13a of the CRT 13.

The operation control unit 20 waits for the next operation in this state.

② Fixed Key Procedure 1

A user monitors the guidance message "MODE1" displayed on the CRT screen 13 and depresses, e.g., the STANDARD key of the MODE1 keys.

When the input processing managing unit $s_0$ detects the key operation, it reads out the operation member information shown in FIG. 6A from the memory unit 22, determines in accordance with a code value of the input key that the input key is a fixed key, and causes the fixed key individual input processing unit $s_1$ to perform input processing. The fixed key individual input processing unit $s_1$ converts the input from the STANDARD key into an internal code constituted by the type (in this case, a fixed key) of the key and a number for identifying an individual fixed key and outputs the internal code.

The response processing managing unit $sa_0$ refers to the fixed key procedure information 1 and reads out the guidance-response information No. 1 shown in FIG. 6C. The response processing managing unit $sa_0$ determines that the response display indicates "LAMP" and the response processing indicates "ON" and turns on the lamp in the STANDARD key on the operation panel 10.

The managing unit U determines in accordance with the STANDARD key information supplied in the form of an internal code from the input processing unit S and the fixed key procedure information shown in FIG. 6B that the next operation procedure is the fixed key procedure 2a. The managing unit U therefore refers to the fixed key procedure information 2a from the memory unit 22 and acknowledges that the next guidance display No. is "2a" to the guidance display processing managing unit $t_0$.

The guidance display processing managing unit $t_0$ reads out the guidance-response display information No. 2a shown in FIG. 6C and causes the CRT display-individual guidance display processing unit $t_2$ to display a guidance message "MODE2" in the guidance display area 13a of the CRT screen 13.

The operation control unit 20 waits for the next operation in this state.

③ Fixed Key Procedure 2a

The user monitors the guidance message "MODE1" on the CRT screen and depresses, e.g., the $R_x$ key of the MODE2 keys.

The following operation is similar to that of the ② fixed key procedure 1 described above.

That is, the input processing managing unit $s_0$ causes the fixed key individual input processing unit $s_1$ to convert the input from the $R_x$ key into an internal code and output the internal code on the basis of FIG. 6A.

The response processing managing unit $sa_0$ refers to the fixed key procedure information $2a$ and turns on the lamp in the $R_x$ key on the operation panel 10 on the basis of the guidance-response information No. $2a$.

The managing unit U determines in accordance with the coded $R_x$ key information from the input response processing unit S and the fixed key procedure information $2a$ shown in FIG. 6B that the next operation procedure is the F key procedure B1. The managing unit U therefore refers to the F key procedure B1 from the memory unit 22 and acknowledges that the next guidance display No. is "B1" to the guidance display processing managing unit $t_0$.

The guidance display processing managing unit $t_0$ reads out the guidance-response information No. B1 shown in FIG. 7B and causes the CRT display-individual guidance display processing unit $t_2$ to display a guidance message "MENU SELECT" on the CRT screen 13 and to display "RF FREQ", "RF LEVEL", and "AF OUTPUT" in the F key label display areas $13c$ in correspondence with the F keys a, b, and c, respectively.

The operation control unit 20 waits for the next operation in this state.

④ F Key Procedure B1

The user monitors the guidance message "MENU SELECT" on the CRT screen 13 and depresses, e.g., the F key a to select the "RF FREQ" function.

The input processing managing unit $s_0$ reads out the operation member information shown in FIG. 6A from the memory unit 22 and causes the soft key individual input processing unit $s_2$ to convert the input from the F key a into an internal code and output the code.

The response processing managing unit $sa_0$ refers to the F key procedure B1 shown in FIG. 7A reads out the guidance-response information No. B1 shown in FIG. 7B, and determines that the response display indicates "CRT" and the response processing indicates "INVERTED DISPLAY". The response processing managing unit $sa_0$ therefore performs an inverted display in which a character portion of characters "RF FREQ" is displayed in black and a portion around the character portion is displayed in white on the CRT screen 13 of the operation panel 10.

The managing unit U determines in accordance with the F key a signal supplied in the form of an internal code from the input response processing unit S and the F key procedure information B1 shown in FIG. 7B that the next operation procedure is the F key procedure $2a$. The managing unit U therefore refers to the F key procedure information $B2a$ from the memory unit 22 and acknowledges that the next guidance-display information No. is "$B2a$" to the guidance display processing managing unit $t_0$.

The guidance display processing managing unit $t_0$ reads out the guidance-response information No. $B2a$ shown in Fig. 7B and causes the CRT display-individual guidance display processing unit $t_2$ to display the guidance message "RF FREQ" in the guidance display area $13a$ of the CRT screen 13 and to display "FREQ CAL" and "RETURN" in the F key label display areas $13c$ with respect to the F keys a and f, respectively.

Since the F keys a and f are defined by the F key procedure information $B2a$ and the guidance-response information $B2a$, the operation control unit 20 waits for inputs from these keys.

⑤ F Key Procedure $B2a$

When the user inputs a number "500,000", for example, from the ten keys $11c$ to set a frequency, the input processing managing unit $s_0$ reads out the operation member information shown in FIG. 6A from the memory unit 22 and causes the ten-key individual input processing unit $s_3$ to store inputs from the ten keys $11c$ in an order of reception and to output a signal to the response processing unit SA each time input information is received.

The response processing managing unit $sa_0$ refers to the F key operation procedure $B2a$ shown in FIG. 7B, reads out the guidance-response information $B2a$ shown in FIG. 7B, and determines that the response display indicates "CRT" and the response processing is "ECHO BACK DISPLAY". The response processing managing unit $sa_0$ therefore causes the ten-key individual response processing unit $sa_3$ to sequentially replace and display numbers such as 5, 50, 500, 5,000, 50,000, and 500,000 on the CRT screen 13 of the operation panel 10 each time the ten keys $11c$ are operated (echo back display).

When the ten-key individual input processing unit $s_3$ of the input processing unit S receives the number 500,000 from the ten keys $11c$ and information indicating that the input is completed, it outputs the number 500,000 to the next determining unit SB as data of an execution unit.

When the determination processing managing unit $sb_0$ of the determining unit SB receives the number 500,000 as data, it causes the integer type numerical data individual analyzing unit $sb_2$ to analyze the data. If the data is valid, the determination processing managing unit $sb_0$ refers to the F key procedure information $B2a$ and causes the individual determining unit to check on the basis of the readout determination condition No. 1 shown in FIG. 8 whether the number 500,000 falls within a predetermined range. Since the valid range of data is 100,000 to 500,000,000 in accordance with the determination condition No. 1, the number 500,000 is determined to be valid. The individual determining unit outputs a command code of integer 1 and the number 500,000 as an output command associated with RF FREQ (frequency) setting to the measuring unit 30 shown in FIG. 30.

In this case, if the data received by the individual determining unit is a number 80,000, this value falls outside the valid range of data. Therefore, this determination result is supplied to the error display processing unit TA. The error display processing managing unit $ta_0$ refers to the F key procedure information $B2a$ and displays "OUT OF RANGE" as an error message in the error message display area $13b$ of the CRT screen 13 on the basis of the readout error display information No. 2 shown in FIG. 9.

When the user completes frequency setting, he or she depresses the F key f ("RETURN"). The managing unit U receives the signal from the F key f via the input processing unit S, refers to the F key procedure $B2a$ to read out the F key procedure B1, and causes the guidance display processing unit T to perform display in accordance with the F key procedure information. Thereafter, the operation returns to the procedure of item 4 F Key Procedure B1.

⑥ The measuring unit 30 executes measurement in accordance with an output from the determining unit SB.

In this manner, a procedure having a tree structure in accordance with which measurement progresses is determined by the information stored in the memory unit 22, and the general purpose processing unit 21 does not have a tree-structure procedure.

SECOND EMBODIMENT

The above first embodiment can satisfy diversified requests of users by only changing the contents in definition information for defining user interface conditions stored in the memory unit 22.

The second embodiment to be described below can satisfy a user's request even when the request is frequently changed.

The second embodiment will be described below mainly with reference to differences with respect to the first embodiment. Note that the arrangement and operation of the above first embodiment are similarly used in the second embodiment.

Figure 10A:
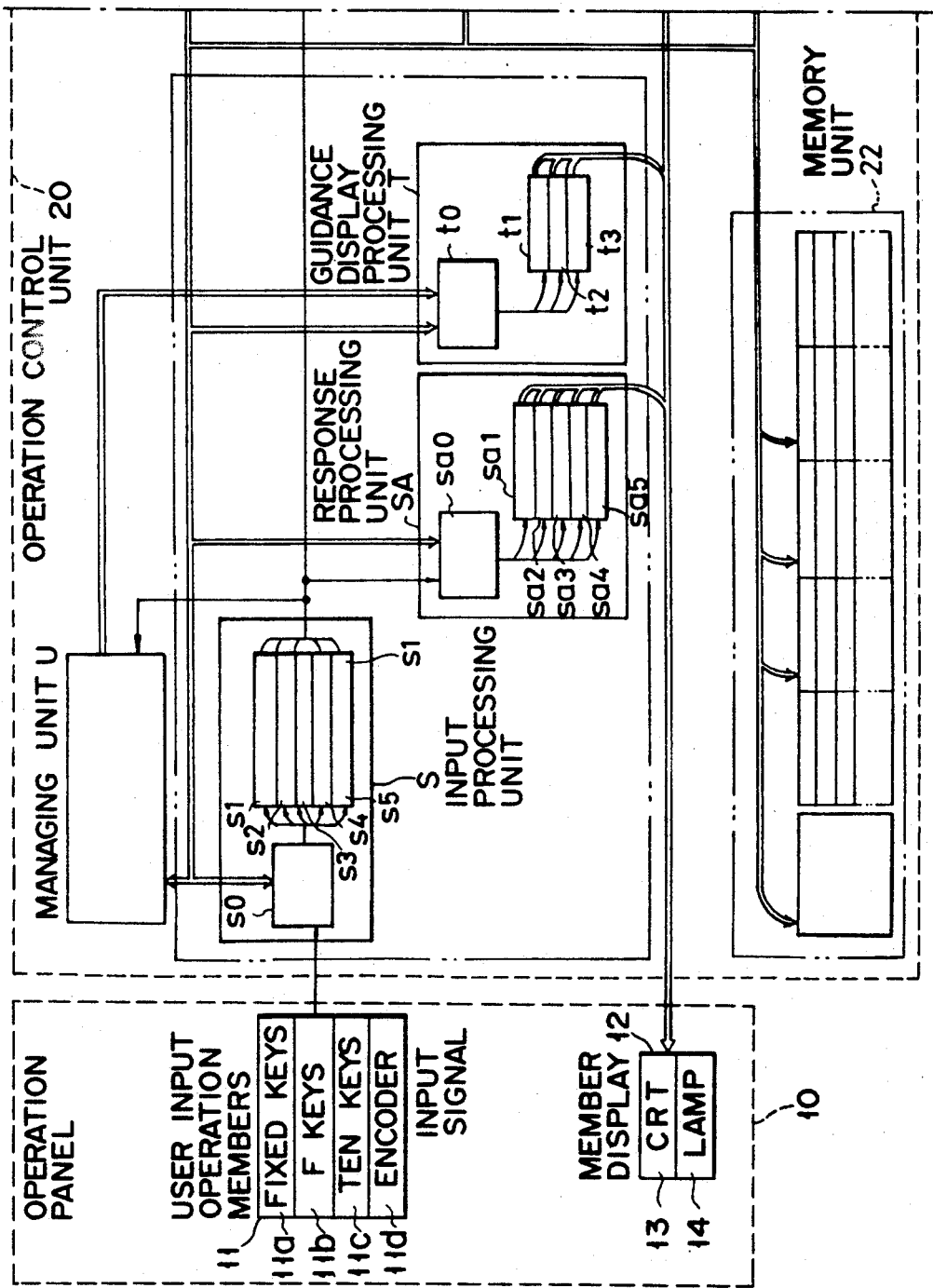
FIGS. 10A and 10B are block diagrams for explaining an arrangement of the second embodiment of an electronic measuring apparatus according to the present invention.
Figure 10B:
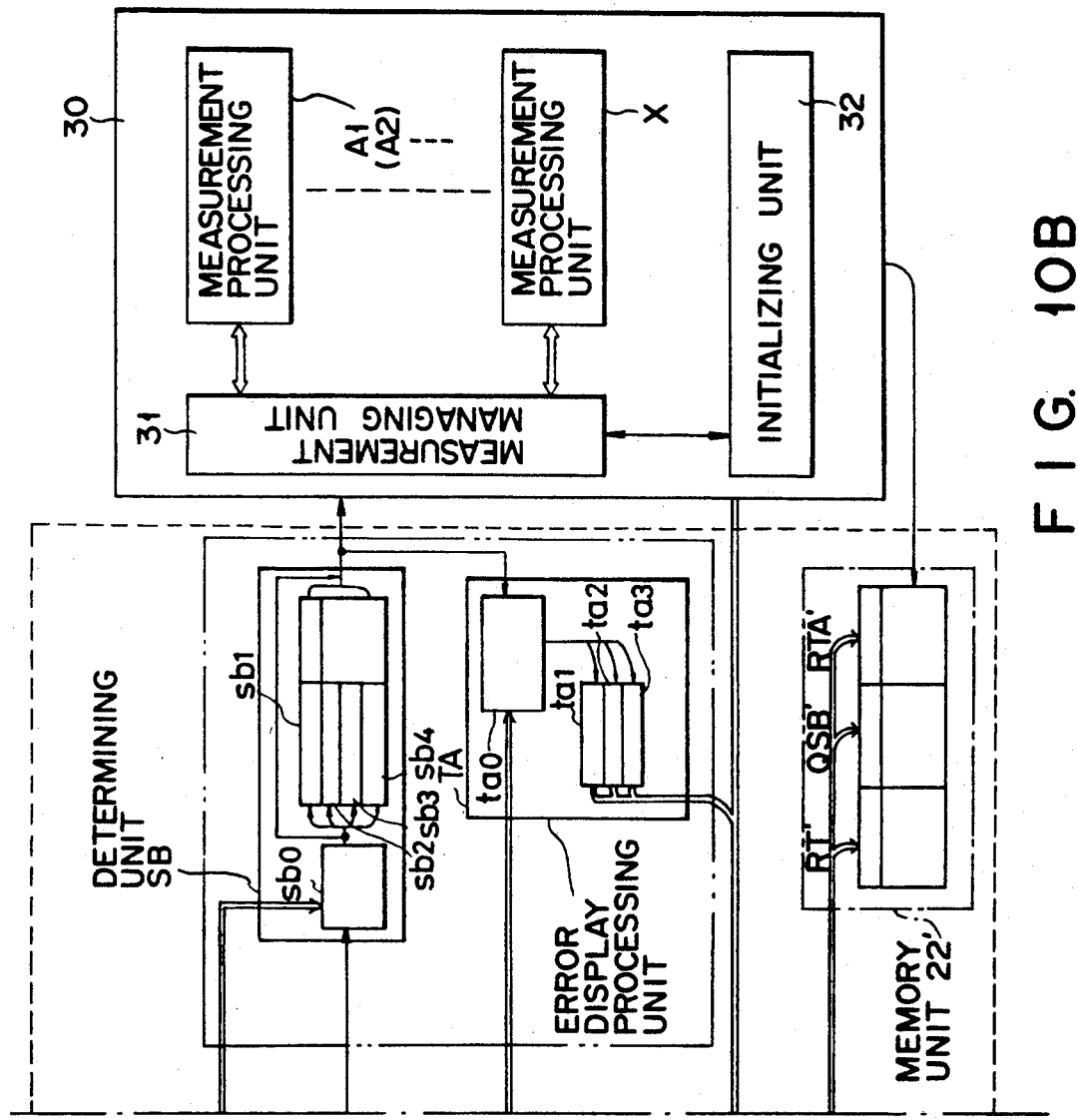

FIGS. 10A and 10B show arrangements of the second embodiment. Referring to FIGS. 10A and 10B, an arrow of each connection line between constituting elements indicates the direction of an information or data flow. If a flow of control is taken into consideration, the connection line is bidirectional.

The arrangement shown in FIGS. 10A and 10B additionally includes a memory unit 22' for storing information of the guidance display information RT, the determination condition QSB, and the error display information RTA which are stored in the memory unit 22 and tend to be frequently changed as guidance display information RT', a determination condition QSB', and error display information RTA', respectively. In this arrangement, a measuring unit 30 comprises measurement processing units A, B, . . . , X mainly having a hardware arrangement and a measurement managing unit 31, and an initializing unit 32 for causing the measurement processing units A, B, . . . , X to systematically operate.

Of these constituting parts, the measurement processing unit A, for example, has a unit structure in which measurement processing units A1 and A2 are selectively used such that the measurement processing unit A2 operates in a frequency range of 100 kHz to 500 MHz and the measurement processing unit A1 operates in a frequency range of 500 MHz to 2 GHz.

The measurement managing unit 31 rewrites information stored in the memory unit 22' on the basis of the contents processed by the initializing unit 32 upon initialization.

An operation control unit 20 can access both the memory units 22 and 22' to read out information therefrom.

The second embodiment will be described below by replacing FIG. 8 of FIGS. 1 to 9 described in the first embodiment with FIG. 11. The drawings except for FIG. 8 are the same in the second embodiment, and the operations associated with the drawings are also identical.

A difference between FIGS. 8 and 11 is that data in an item of valid value/range of data which is represented by numbers in FIG. 8 is represented by a reference condition NO. in FIG. 11. Information corresponding to this reference condition NO is stored in the determination condition QSB' of the memory unit 22' as shown in FIG. 12.

A series of operations of the second embodiment will be described below.

(i) When a power switch of this embodiment is turned on, the measuring unit 30 is activated and the initialization processing unit 32 detects the state of each measurement processing unit. For example, if the measurement processing unit A2 is used as a unit of the measurement processing unit A, the initialization processing unit 32 detects specific information associated with the measurement processing unit A2 (e.g., information such as the name or number of the measurement processing unit A2 which can be discriminated from other units) and sends the detected information to the measurement managing unit 31. On the basis of the information, the measurement managing unit 31 updates data 100,000 (100 kHz) and 500,000,000 (500 MHz) written in a reference condition N01 (in this case, the lower frequency limit) and a reference condition N02 (the upper frequency limit) stored in the determination condition QSB' of the memory unit 22' as shown in FIG. 12 to be 500,000,000 (500 MHz) and 2,000,000,000 (2 GHz), respectively.

The above processing is a preparation stage.

The initialization processing unit 32 may detect the type of unit of the measurement processing unit A by exchanging information with the unit of the measurement processing unit A upon initialization as described above or by receiving information about the unit from a unit select switch arranged in a user input operation unit 11 of an operation panel 10.

(ii) The second embodiment similarly operates in an order of items ①, ②, and ③ of the first embodiment.

Assume that the state of the second embodiment from then on corresponds to a procedure 2 shown in FIG. 13 in which a frequency can be set from ten keys. Referring to FIG. 13, the second embodiment waits for an input from ten keys 11a. A condition required by a determination processing unit SB to check user input information from the ten keys 11a is a determination condition N01. A practical format of the determination condition N01 is shown in FIG. 11.

(iii) An operation to performed when a number 750,000,000 is set from the ten keys 11a will be described.

When the determination processing unit SB receives 750,000,000, it reads out the determination condition N01 and error display information N02 as shown in FIGS. 11 and 9, respectively, from the memory unit 22 on the basis of ten key determination condition N01 and error display N02 of operation procedure information (FIG. 13) of the procedure 2. In addition, the determination processing unit SB refers to reference conditions N01 and N02 from the item of valid value/range of data of the determination condition N01 shown in FIG. 11 and reads out numbers 500,000,000 and 2,000,000,000 (updated data shown in FIG. 12) corresponding to the reference conditions N01 and N02 from the determination condition QSB' in the memory unit 22'. If the second processing unit SB determines that the number 750,000,000 supplied from the input processing unit S falls within the range of 500,000,000 to 2,000,000,000, it sends a command code of integer 1 and the number 750,000,000 as an output code associated with FREQ (frequency) setting to the measuring unit 30.

Other operations are the same as those of the first embodiment.

The determination conditions QSB and QSB' are mainly described above in the operations of items (i) and (ii). The operations, however, can be similarly applied to the guidance display information RT and RT' and the error display information RTA and RTA'

The second embodiment is characterized in that a user interface function can be changed in correspondence with a change in state (including measurement conditions, an operation state, and the like) of the measuring unit 30.

In the above second embodiment, the memory unit 22' is described as a unit independent from the memory unit 22. However, the memory unit 22 may be constituted by a RAM without using the memory unit 22' so that stored information of the RAM can be written by the measuring unit 30.

In each of the above first and second embodiments, a ROM may be mounted as the memory unit 22 in the apparatus, or a plurality of memory units 22 storing data in units of types of interface specifications may be prepared so that a user can replace the units, i.e., a plug-in structure may be adopted.

In addition, a RAM may be used as the memory unit 22 and a floppy disk, a bubble cassette, or a memory card (i.e., an IC, magnetic, or optical memory card) may be used as a recording medium so that the contents of the memory unit 22 can be rewritten as needed in accordance with data recorded in the medium in units of types of user interface specifications.

Furthermore, the external control information shown in FIG. 1 is used when the apparatus is controlled by an external controller. Also in this case, the operation is exactly the same as described above except that the external control information is received in place of the user input information from the operation panel 10.

As described above, according to the present invention, a measuring unit and an operation control unit have independent structures from each other, and the operation control unit is constituted by a general purpose processing unit for processing user input information and a memory unit for organically combining and storing information for defining execution contents to be processed by the general purpose processing unit.

Therefore, the operation control unit can be effectively used as a common resource on both user and manufacturer sides and supplied sooner in accordance with various requests of individual users.

In addition, the present invention can improve productivity on a user side since it can functionally satisfy various requests of users and can improve productivity on a manufacturer side since its operation control unit can be reused as a resource by the manufacturers.

Note that this operation control unit which is illustrated as a functional block is actually constituted by hardware (e.g., a CPU) and software (programs for allowing the CPU to perform predetermined operations). Therefore, an effect of reusing the operation control unit including software which requires many labors and a long time in development is great.

Furthermore, since the operation control unit once manufactured and used can be reused in another application, the reliability of an electronic measuring apparatus using the same (mainly a software portion) can be effectively improved.

Industrial Applicability

The present invention can be widely applied to general electronic measuring apparatuses associated with testing and measurement in a broad sense to achieve systematization of automatic measurement including, e.g., ① a spectrum analyzer for analyzing a spectrum of an electric signal while performing frequency sweeping, ② an optical spectrum analyzer for similarly analyzing a spectrum of an optical signal, ③ an optical pulse testing device (OTDR) for sending pulse light to an optical fiber to measure an amount of light reflected by the optical fiber or a time required for reflection, thereby measuring a breaking point or a loss of the optical fiber, ④ a network analyzer for measuring transmission characteristics, ⑤ a radio communication analyzer for measuring the characteristics of a mobile radio transmitter/receiver, ⑥ a pulse pattern generator for generating a pulse pattern of a digital line, ⑦ a signal generator for generating various types of signals, and ⑧ an error rate measuring device for measuring an error rate of a digital line.

What is claimed is:

1. An electronic measuring apparatus comprising:
   a measuring unit for performing an electronic measurement under a predetermined measurement condition corresponding to an object to be measured to obtain measurement data;
   a user input operation unit including a plurality of individual operating means for setting said predetermined measurement condition in said measuring unit, each of said plurality of individual operating means being provided with at least one operation member of a given type selected from a plurality of types of operation members which include, at least, operation members of a first type, operation members of a second type, an operation member of a third type, and operation members of a fourth type;
   said operation members of said first type being a plurality of fixed keys, said operation members of said second type being a plurality of soft keys, said operation member of said third type being an encoder, and said operation members of said fourth type being a plurality of up/down keys;
   a display unit including a plurality of individual display means for displaying guidance display information corresponding to the predetermined measurement condition set by said user input operating unit, each of said plurality of individual display means being provided with one of a plurality of types of display members including at least one of a lamp, a CRT, and a segment indicator; and
   an operation control unit including:
   a memory unit for storing, in advance, operating means information indicating arrangements of said individual operating means included in said user input operation unit, and a series of definition information associated with at least said guidance display information, as display information for said plurality of individual display means included in said display unit and operation procedure information, and
      a general purpose processing unit for performing predetermined processing, on the basis of said series of definition information stored in said memory unit, in correspondence with all operations of said operation members of said plurality of individual operating means and all displays of said display members of said plurality of individual display means and, for providing said predetermined measurement condition set by said user input operating unit to said measuring unit; and
   wherein said general purpose processing unit of said operation control unit comprises:

a guidance display processing unit for performing display processing, for receiving said guidance display information from said memory unit and for causing said display means to display received guidance display information in accordance with all of said display members of said plurality of individual display means;

an input processing unit for performing an input processing, for receiving said operation information from said plurality of individual operating means, and for classifying received operation information in accordance with said operating means information from said memory unit, said input processing unit outputting classified information in predetermined units to said measuring unit in correspondence with all of said operation members of said plurality of individual operating means; and a managing unit for switching a hierarchical level of an operation procedure in accordance with said operation procedure information from said memory unit, after said input processing is performed by said input processing unit, thereby causing said display unit to refer to a next operation procedure information and to cause said display unit to display a next guidance display information, and wherein:

when a plurality of electronic measuring apparatus for measuring objects, which are similar in type to each other, are being manufactured, a manufacturer of said electronic measuring apparatus need only alter a memory content of each of a plurality of memory units of said respective electronic measuring apparatus in accordance with at least one requested feature made by at least one user; and when a plurality of electronic measuring apparatus for measuring objects, which differ in type from each other, are being manufactured, a manufacturer of said electronic measuring apparatus need only alter said user input operation unit, said display unit, and said contents of said memory unit in each of said electronic measuring apparatus being manufactured in accordance with said at least one requested function made by said at least one user;

whereby said general purpose processing unit of each of said electronic measuring apparatus being manufactured is unmodified while each electronic measuring apparatus is provided with said at least one requested feature made by said at least one user.

2. An electronic measuring apparatus according to claim 1, wherein:

said input processing unit comprises a plurality of parallel individual input processing units corresponding to any of said operating members of said individual operating means; and an input processing managing unit for commanding one of said plurality of individual input processing units to perform input processing for said operation information from said operating means in accordance with definition information from said memory unit.

3. An electronic measuring apparatus according to claim 1, wherein:

said guidance display processing unit comprises a plurality of parallel individual guidance display processing units corresponding to any of said display members of said individual display means; and a guidance processing managing unit for commanding one of said plurality of individual guidance display processing units to perform display processing in accordance with definition information from said memory unit.

4. An electronic measuring apparatus according to claim 1, wherein said memory unit stores said operating means information to be provided to said input processing unit as said definition information and said guidance display information to be provided to said guidance display processing unit as said definition information in correspondence with each other in a form of a list for each of a plurality of hierarchical levels and stores operation procedure information for determining a hierarchical level to said operating means for each of said plurality of hierarchical levels.

5. An electronic measuring apparatus according to claim 4, wherein the operation procedure information stored for each hierarchical level has a format so that guidance display information corresponding to each hierarchical level can be obtained by referring to the operation procedure information.

6. An electronic measuring apparatus according to claim 1, wherein said general purpose processing unit further comprises a response processing unit for performing display processing for providing an operation check on said display unit in correspondence with an operation of said operating means.

7. An electronic measuring apparatus according to claim 6, wherein said memory unit further stores response processing information for each hierarchical level.

8. An electronic measuring apparatus according to claim 1, wherein said general purpose processing unit further comprises a determining unit for analyzing operation information from said operating means to check said operation information for validity.

9. An electronic measuring apparatus according to claim 8, wherein said general purpose processing unit further comprises:

an error display processing unit for performing display processing and for displaying an error determination result from a determining unit on said display unit.

10. An electronic measuring apparatus according to claim 9, wherein said memory unit further stores error display information for each hierarchical level.

11. An electronic measuring apparatus according to claim 8, wherein said memory unit further stores determination conditions for each hierarchical level.

12. An electronic measuring apparatus according to claim 1, wherein a part of said information stored in said memory unit is rewrittable by a measuring unit.

* * * * *